(12) United States Patent
Heggem

(10) Patent No.: US 7,464,051 B1
(45) Date of Patent: Dec. 9, 2008

(54) CONNECTING BUSINESS-TO-BUSINESS BUYERS AND SELLERS

(76) Inventor: Richard A. Heggem, 411A Wright Ave., Morgan Hill, CA (US) 95037

( * ) Notice: Subject to any disclaimer, the term of this patent is extended or adjusted under 35 U.S.C. 154(b) by 755 days.

(21) Appl. No.: 11/153,929

(22) Filed: Jun. 15, 2005

Related U.S. Application Data

(63) Continuation-in-part of application No. 10/752,163, filed on Jan. 5, 2004.

(51) Int. Cl.
*G06Q 30/00* (2006.01)
*G06Q 90/00* (2006.01)

(52) U.S. Cl. .......................................... 705/26; 705/500

(58) Field of Classification Search .................. 705/26, 705/500
See application file for complete search history.

(56) References Cited

U.S. PATENT DOCUMENTS

| | | | |
|---|---|---|---|
| 5,592,375 | A | 1/1997 | Salmon et al. |
| 5,970,492 | A | 10/1999 | Nielsen |
| 6,029,175 | A | 2/2000 | Chow et al. |
| 6,460,036 | B1 | 10/2002 | Herz |
| 7,113,919 | B1 | 9/2006 | Norris et al. |
| 7,124,107 | B1 | 10/2006 | Pishevar et al. |
| 7,310,641 | B2 * | 12/2007 | Moore et al. .................. 707/6 |
| 2001/0034631 | A1 | 10/2001 | Kiselik |
| 2001/0051913 | A1 | 12/2001 | Vashistha et al. |
| 2002/0013735 | A1 | 1/2002 | Arora et al. |
| 2002/0099592 | A1 * | 7/2002 | Donahue ..................... 705/10 |
| 2002/0111897 | A1 | 8/2002 | Davis |
| 2002/0165814 | A1 | 11/2002 | Lee et al. |
| 2002/0174089 | A1 | 11/2002 | Tenorio |
| 2002/0198818 | A1 | 12/2002 | Scott et al. |
| 2003/0004850 | A1 | 1/2003 | Li et al. |
| 2003/0172022 | A1 | 9/2003 | Coyne et al. |
| 2004/0176993 | A1 * | 9/2004 | Rajasingham ................ 705/10 |
| 2005/0055306 | A1 | 3/2005 | Miller et al. |
| 2005/0096955 | A1 | 5/2005 | Sorensen |
| 2006/0173963 | A1 * | 8/2006 | Roseway et al. ............ 709/206 |

FOREIGN PATENT DOCUMENTS

WO WO-0108067 A1 * 2/2001

OTHER PUBLICATIONS

Wall, M., "Snap up a Bargain at Online Auctions; Web Wise," Times of London, Features section, Mar. 25, 2001.*
Pavlou, P.A. et al., "Nature and Role of Feedback Text Comments in Online Marketplace; Implications for Trust Building, Price Premiums, and Seller Differentiation," Information Systems Research, vol. 17, No. 4, pp. 392-414, Dec. 2006.*
Elance, Inc., "Corporate Overview, The Better Way to Buy and Manage Services," 2000-2004, http://www.elance.com/c/static/main/displayhtml.pl?file=about.html&, data retrieved Apr. 1, 2004, pp. 1-2.

(Continued)

*Primary Examiner*—Nicholas D Rosen

(57) ABSTRACT

A system for connecting buying entities and selling entities in a business-to-business context is disclosed. In one aspect, the system allows buying entities to associate with one another to form "trusted buyer networks" so as to share "trusted buyer insights" about selling entities. In one aspect, the system allows selling entities to see the size of a buying entity's "trusted buyer network" so that they know the potential impact of either satisfying or disappointing the buying entity and receiving a corresponding rating visible to the buying entity's entire "trusted buyer network."

14 Claims, 9 Drawing Sheets

OTHER PUBLICATIONS

Elance, Inc., "Elance History," 2000-2004, http://www.elance.com/c/static/main/displayhtml.pl?file=heritage.html, data retrieved Apr. 1, 2004, pp. 1-2.

Scott2, U.S. Appl. No. 09/571,792 that was incorporated in its entirety into PGPub 2002/0198818 (para 001), now abandoned, dated May 16, 2000.

* cited by examiner

CONNECTING BUSINESS-TO-BUSINESS BUYERS AND SELLERS

RELATED APPLICATIONS AND PRIORITY CLAIM

The present application claims priority as a continuation-in-part to U.S. patent application Ser. No. 10/752,163, which was filed on Jan. 5, 2004, which is titled "CONNECTING BUSINESS-TO-BUSINESS BUYERS AND SELLERS," the applicant for which is Richard A. Heggem, and which hereby is incorporated by reference in its entirety for all purposes as though fully and originally disclosed herein.

FIELD OF THE INVENTION

The present invention relates generally to information management systems and, more specifically, to a machine-implemented architecture for connecting buying entities with selling entities in a business-to-business context.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Business organization and people employed by business organizations often are involved in buying and selling activities. People and organizations who are involved in buying activities may be called "buying entities," and people and organizations who are involved in selling activities may be called "selling entities."

All too often, buying entities are bombarded by large amounts of undesired solicitations from selling entities. These solicitations typically comprise advertisements for selling entities' products and/or services. Solicitations may come through a variety of avenues of communication. A selling entity might call a buying entity on the telephone to solicit the buying entity's business. Alternatively or additionally, a selling entity might send an e-mail message to a buying entity's e-mail address to solicit the buying entity's business.

When a selling entity calls a buying entity on the telephone, the buying entity may view the call as a harassment or annoyance. Answering the telephone and communicating with the selling entity often requires the buying entity to interrupt other important tasks. At a minimum, communicating with the selling entity uses some of the buying entity's precious time. If the buying entity is not interested in the solicitation, then the buying entity is faced with the difficult task of terminating the telephone call as quickly as possible. Doing this in a polite manner can be difficult, especially when the selling entity is insistent. Faced with this task too often, a buying entity may become frustrated and angry, and vent these emotions on later-calling selling entities. Such emotional exchanges are not pleasant for either buying entities or selling entities, and are hardly conducive to business.

Similarly, when a selling entity sends an e-mail message to a buying entity, the buying entity may view the e-mail as a harassment or annoyance. A buying entity's e-mail inbox may become congested with "spam" e-mail messages. Separating interesting e-mail messages from spam e-mail messages can be a time-consuming process. A buying entity may have difficulty distinguishing, quickly, between interesting e-mail messages and spam e-mail messages. When a buying entity responds to a selling entity's e-mail message in an effort to cause the selling entity to desist, the response identifies the buying entity to the selling entity. The selling entity often takes the response as verification that the buying entity's e-mail address is valid and active. The selling entity might even compile a list of verified buying entities' e-mail addresses and sell the list to other selling entities. As a result, buying entities that ask selling entities to stop sending e-mailed solicitations may receive an even greater volume of e-mailed solicitations.

One approach to dealing with unwanted telephone calls is to stop answering telephone calls that originate from unknown telephone numbers. Callers' telephone numbers can be detected and displayed by caller identification devices. Similarly, one approach to dealing with unwanted e-mail is to delete, automatically, all e-mail messages that do not originate from known and trusted e-mail addresses. Unfortunately, these approaches can be over-inclusive. There may be some solicitations, even from unknown selling entities, in which a buying entity would be interested.

On the other hand, selling entities are constantly faced with the challenge of directing solicitations to buying entities that are interested in the selling entities' products and/or services. A selling entity might send solicitations in massive amounts to a multitude of different buying entities in hopes that at least a few of those buying entities will be interested. However, this approach tends to alienate uninterested buying entities. Many times, the temporal and monetary cost of contacting interested buying entities outweighs the value of the contacts made. Given many buying entities' reluctance to have any contact with any unknown selling entities, a selling entity may be blocked from contacting even those buying entities that probably would be interested in the selling entity's products and/or services.

Selling entities usually are in competition with other selling entities. When multiple selling entities solicit the same buying entity, each of the selling entities may have difficulty distinguishing itself, to the buying entity, from the other selling entities. Likewise, the buying entity might not have a sufficient informational basis for selecting one selling entity over another, especially if the buying entity is unfamiliar with any of the selling entities. A buying entity may not know whom to trust.

Based on the foregoing, an approach for connecting buying and selling entities that does not suffer from limitations in prior approaches is highly desirable.

SUMMARY OF THE INVENTION

A system and architecture for connecting buying entities and selling entities in a business-to-business context is disclosed. In one aspect, the system includes a mechanism for redirecting, to an Internet-based system, solicitations that a buying entity might normally encounter through telephone or e-mail communications initiated by a selling entity. Using the Internet-based system, a buying entity can review and respond to solicitations at the buying entity's convenience.

In one aspect, the system includes a mechanism that allows a selling entity to specify profiles of buying entities and customized solicitations for each profile. Through the Internet-based system, the customized solicitations may be directed to buying entities that match profiles associated with those customized solicitations.

In one aspect, the system includes a mechanism that automatically ranks and sorts solicitations based on buying entity-specified selling entity filter criteria. In one aspect, the system includes a mechanism that notifies a buying entity about newly received solicitations at a frequency specified by the buying entity. In one aspect, the system includes a mechanism that allows buying entities and selling entities to search for each other based on product categories and/or industry categories with which those entities are self-associated.

In one aspect, the system includes a mechanism that allows a buying entity to broadcast the buying entity's needs to multiple selling entities through the Internet-based system. The needs may be specified according to a hierarchical taxonomy of need categories that permits needs, rather than products, to be specified. As used herein, "products" includes "services". In one aspect, the system includes a mechanism that allows a selling entity to generate listening agents that inform the selling entity about buying entity needs that the selling entity might be able to fulfill. In one aspect, the system includes a mechanism that allows a buying entity and a selling entity to rate each other's performance at each phase of a multi-phased interaction.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
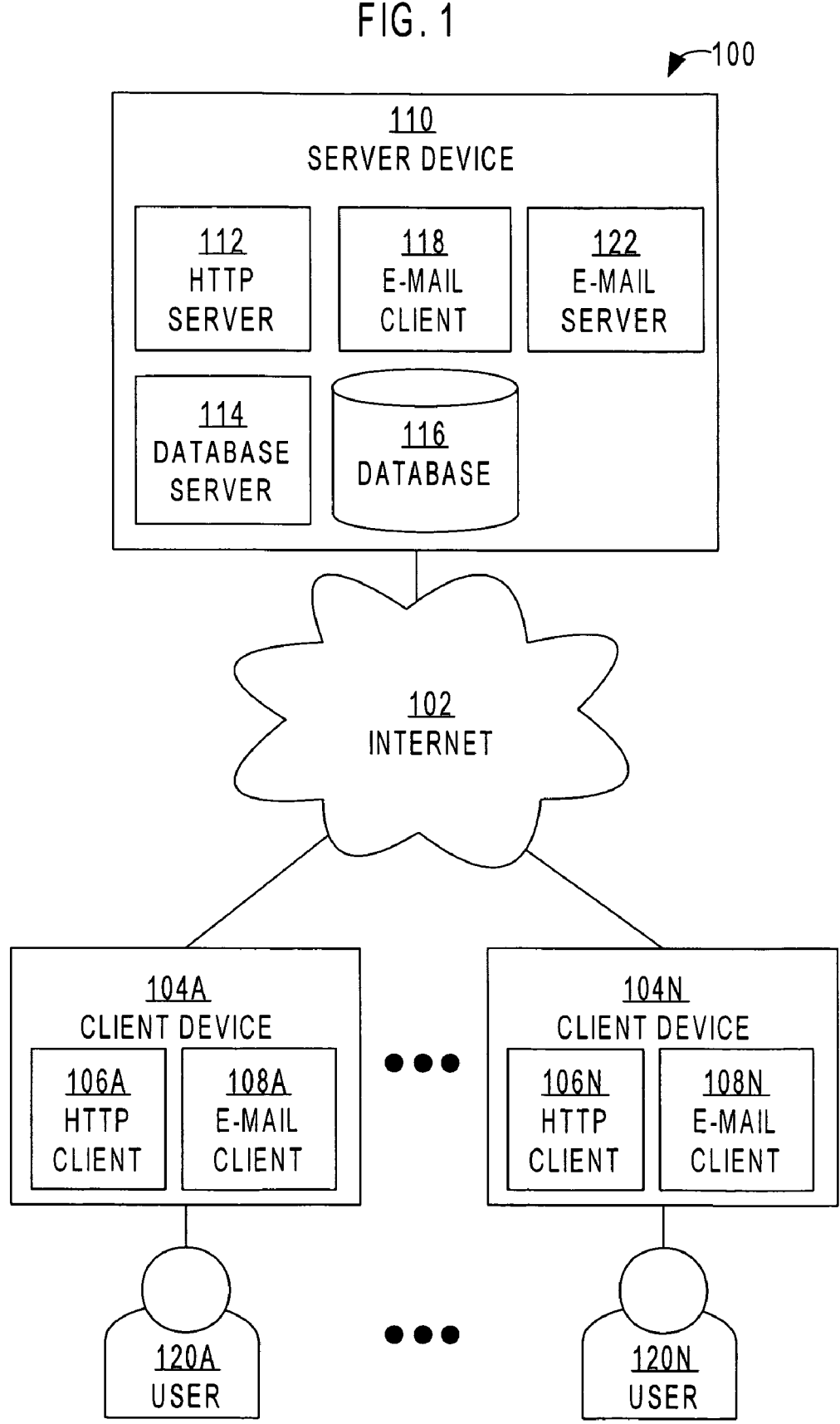
FIG. 1 is a block diagram that depicts a system for connecting buying entities with selling entities, in accordance with an embodiment of the invention.

A method and apparatus for connecting buying entities and selling entities is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. In some instances, flow diagrams are used to depict steps performed in various embodiments of the invention. The invention is not limited to the particular order of steps depicted in the figures and the order may vary, depending upon the requirements of a particular implementation. Furthermore, steps that are depicted and described may be removed and/or other steps may be added, depending upon the requirements of a particular implementation. Various aspects of the invention are described hereinafter in the following sections:

I. OVERVIEW
II. SYSTEM ARCHITECTURE OVERVIEW
III. REDIRECTING SOLICITATIONS
IV. TARGETING SOLICITATIONS
V. RANKING SOLICITATIONS
VI. NOTIFICATION PREFERENCES
VII. ACTING ON SOLICITATIONS
VIII. NEEDCASTS™ ™ AND AGENTS
IX. PIPELINE PHASES AND RATINGS
X. ONGOING RELATIONSHIP PHASE
XI. TRUSTED BUYER NETWORK
XII. REFERRAL INCENTIVES
XIII. IMPLEMENTATION MECHANISMS, ALTERNATIVES & EXTENSIONS

I. Overview

A system and architecture for connecting buying entities with selling entities in a business-to-business context is disclosed. In one aspect, the system includes a mechanism for redirecting, to an Internet-based system, solicitations that a buying entity might normally encounter through telephone or e-mail communications initiated by a selling entity. Using the Internet-based system, a buying entity can review and respond to solicitations at the buying entity's convenience.

In one aspect, the system includes a mechanism that allows a selling entity to specify profiles of buying entities and customized solicitations for each profile. Through the Internet-based system, the customized solicitations may be directed to buying entities that match profiles associated with those customized solicitations.

In one aspect, the system includes a mechanism that automatically ranks and sorts solicitations based on buying entity-specified selling entity filter criteria. In one aspect, the system includes a mechanism that notifies a buying entity about newly received solicitations at a frequency specified by the buying entity. In one aspect, the system includes a mechanism that allows buying entities and selling entities to search for each other based on product categories and/or industry categories with which those entities are self-associated.

In one aspect, the system includes a mechanism that allows a buying entity to broadcast the buying entity's needs to multiple selling entities through the Internet-based system. A buying entity may specify such needs using to a hierarchical taxonomy of need categories that permits needs, rather than products, to be specified. In one aspect, the system includes a mechanism that allows a selling entity to generate listening agents that inform the selling entity about buying entity needs that the selling entity might be able to fulfill. In one aspect, the system includes a mechanism that allows a buying entity and a selling entity to rate each other's performance at each phase of a multi-phased interaction.

II. System Architecture Overview

FIG. 1 is a block diagram that depicts a system 100 for connecting buying entities with selling entities, in accordance with an embodiment of the invention. System 100 includes the Internet 102, client devices 104A-N, and server device 110. Client devices 104A-N are coupled communicatively with Internet 102. Server device 110 also is coupled communicatively with Internet 102. Client devices 104A-N include Hypertext Transfer Protocol (HTTP) clients 106A-N, respectively, and e-mail clients 108A-N, respectively. Server device 110 includes HTTP server 112, database server 114, database 116, e-mail client 118, and e-mail server 122.

Users 120A-N are individual people who use client devices 104A-N, respectively, to send information to and receive information from server device 110. Some of users 120A-N are buying entities, some of users 120A-N are selling entities, and some of users 120A-N are both buying entities and selling entities. Client devices 104A-N are devices that are configured to interface with both a human being and Internet 102. For example, client devices 104A-N may include general-purpose computers, diskless network workstations, and/or Internet appliances.

HTTP clients 106A-N are programs that are configured to send HTTP requests and receive HTTP responses. As used herein, HTTP includes HTTPS. HTTP clients 106A-N are also called "browsers." For example, HTTP clients 106A-N may include Microsoft Internet Explorer, Netscape Navigator, and/or Mozilla Firefox. HTTP clients 106A-N receive information from users 120A-N, respectively, and send that information in the form of HTTP requests to HTTP server 112. HTTP clients 106A-N receive HTTP responses from HTTP server 112 and provide some or all of the information contained in such HTTP responses to users 120A-N, respectively. HTTP clients 106A-N send HTTP requests and receive HTTP responses through Internet 102.

E-mail clients 108A-N are programs that are configured to send and receive e-mail messages according to an e-mail protocol such as Simple Mail Transfer (SMTP) protocol. For example, e-mail clients 108A-N may include Microsoft Outlook. E-mail clients 108A-N receive information from users 120A-N, respectively, and send that information in the form of e-mail messages to an e-mail server. E-mail clients 108A-N receive e-mail messages from e-mail servers and provide some or all of the information contained in such e-mail messages to users 120A-N, respectively. E-mail clients send and receive e-mail messages through Internet 102.

Like client devices 104A-N, server device 110 is a device that is configured to interface, directly or indirectly, with Internet 102. For example, server device 110 may be a general-purpose computer. HTTP server 112 is a program that is configured to receive HTTP requests and send HTTP responses. HTTP server 112 is also called a "web server." HTTP server 112 receives HTTP requests from HTTP clients 106A-N through Internet 102. HTTP server 112 sends HTTP responses to HTTP clients 106A-N through Internet 102.

HTTP server 112 may interface with a variety of programs that reside on server device 110. HTTP server 112 may send, to such programs, information received in HTTP requests. Similarly, HTTP server 112 may receive, from such programs, information that HTTP server 112 then sends in HTTP responses.

Database server 114 is a program that is configured to receive database commands from programs resident on server device 110. Database server 114 also is configured to execute such database commands to store data in, modify data in, or retrieve data from database 116. Database server 114 also is configured to send retrieved data to programs resident on server device 110. For example, database commands may take the form of Structured Query Language (SQL) statements. Database server 114 may select, from database 116, data that satisfies criteria specified in such SQL statements.

E-mail client 118 is similar to e-mail clients 108A-N in that e-mail client 118 also is a program that are configured to send and receive e-mail messages according to an e-mail protocol. E-mail client 118 receives information from programs resident on server device 110, and sends that information in the form of e-mail messages to e-mail server 122. E-mail client 118 receives e-mail messages from e-mail server 122 and provides some or all of the information contained in such e-mail messages to programs resident on server device 110.

Database 116 stores information about one or more buyer accounts and one or more seller accounts. Each of users 120A-N may be associated with one or more buyer accounts and/or one or more seller accounts. Among other information, each account may be associated with a separate username, password, and an account type that indicates whether that account is a buyer account or a seller account. For each account, database 116 stores a separate set of information items that are associated with that account. The set of information items associated with a particular account may vary depending on the account's account type.

Figure 2:
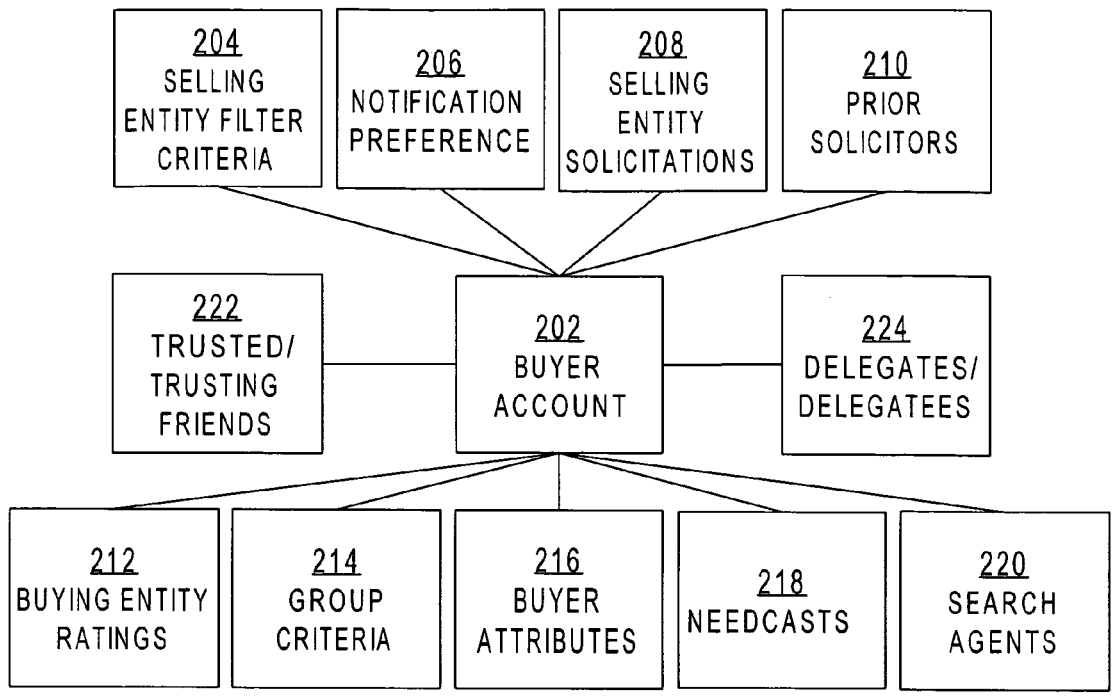
FIG. 2 is a block diagram that depicts a set of information items that may be associated, in a database, with a buyer account, in accordance with an embodiment of the invention.

FIG. 2 is a block diagram that depicts a set of information items that may be associated, in a database, with a buyer account, in accordance with an embodiment of the invention. For example, the information items depicted in FIG. 2, and the associations between those information items and a buyer account, may be stored in database 116.

A buyer account 202 may be associated with a username that is unique among usernames stored in database 116. Buyer account 202 may be associated with a set of information items including selling entity filter criteria 204, a notification preference 206, selling entity solicitations 208, prior solicitors 210, buying entity ratings 212, group criteria 214, buyer attributes 216, Needcasts™ 218, trusted and trusting friends 222, and delegates and delegatees 224. Different buyer accounts may be associated with separate sets of such information items. For example, a first buyer account may be associated with a first set of selling entity filter criteria, and a second, separate buyer account may be associated with a second, separate set of selling entity filter criteria.

Figure 3:
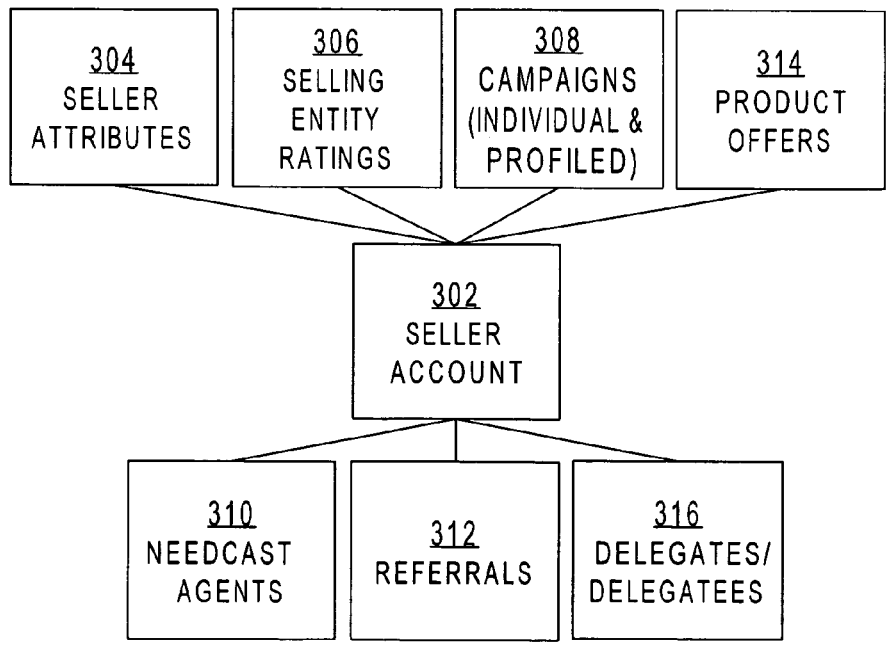
FIG. 3 is a block diagram that depicts a set of information items that may be associated, in a database, with a seller account, in accordance with an embodiment of the invention.

FIG. 3 is a block diagram that depicts a set of information items that may be associated, in a database, with a seller account, in accordance with an embodiment of the invention. For example, the information items depicted in FIG. 3, and the associations between those information items and a seller account, may be stored in database 116.

A seller account 302 may be associated with a username that is unique among usernames stored in database 116. Seller account 302 may be associated with a set of information items including seller attributes 304, selling entity ratings 306, campaigns (individual and profiled) 308, Needcast™ agents 310, referrals 312, product offers 314, and delegates and delegatees 316. Different seller accounts may be associated with separate sets of such information items. For example, a first seller account may be associated with a first set of campaigns, and a second, separate buyer account may be associated with a second, separate set of campaigns.

Information items described above may be used in interactions between components of system 100. Examples of such components using these information items are described in further detail below.

III. Redirecting Solicitations

In one embodiment, system 100 includes a mechanism that facilitates the redirection of solicitations, which have been directed to a buying entity, to server device 110 instead. When a buying entity receives a telephone call from a selling entity, the buying entity may instruct the selling entity, via voice, voicemail, or proxy, to access server device 110 instead of calling the buying entity. Alternatively or additionally, when a buying entity receives an e-mail message from a selling entity, the buying entity may forward the e-mail message to server device 110, which may responsively and automatically send, to the selling entity, an e-mail message that instructs the selling entity to access server device 110 instead of sending e-mail messages to the buying entity. To motivate the selling entity to use the services offered by server device 110, server device 110 may offer the selling entity a guarantee that all solicitations sent through server device 110 will be delivered to the buying entity.

Figure 4:
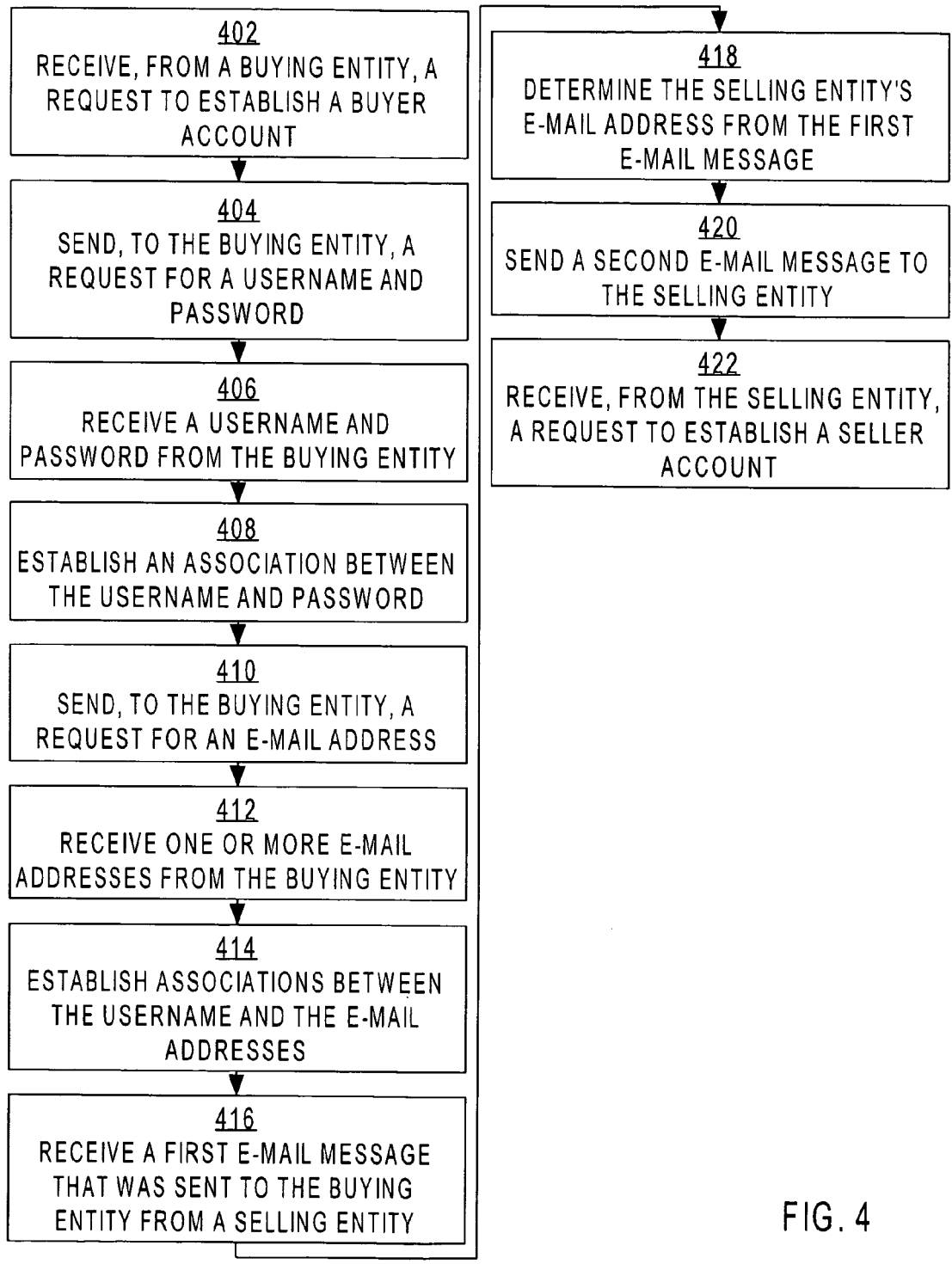
FIG. 4 is a flow diagram that depicts an approach for redirecting e-mailed solicitations, in accordance with an embodiment of the invention.

FIG. 4 is a flow diagram that depicts an approach for redirecting e-mailed solicitations, in accordance with an embodiment of the invention. The approach depicted in FIG. 4 may be implemented, for example, by server device 110.

In block 402, a request to establish a buyer account is received from a buying entity. For example, HTTP server 112 may receive, from HTTP client 106A, a request to establish a buyer account for user 120A. In block 404, a request for a username and password is sent to the buying entity. For example, HTTP server 112 may send, to HTTP client 106A, a request for a username and password. In block 406, a username and password is received from the buying entity. For example, HTTP server 112 may receive, from HTTP client 106A, a username and password selected by user 120A. In block 408, an association is established between the username and the password. For example, database server 114 may establish, in database 116, an association between the username and password. As a result, a buyer account is established in database 116. In one embodiment, in response to the establishment of the buying entity's buyer account, HTTP server 112 sends, to the buying entity's HTTP client, instructions that tell the buying entity to tell selling entities to access a specified uniform resource locator (URL). The instructions may tell the buying entity to record, on the buying entity's voicemail, a message that tells selling entities to access the specified URL instead of soliciting the buying entity over the phone. The instructions may suggest one or more voice scripts that the buying entity may use in order to tell selling entities to access the specified URL. The instructions may tell the buying entity to forward, to a specified e-mail address, e-mail messages that the buying entity receives from selling entities.

In block 410, a request for one or more e-mail addresses is sent to the buying entity. For example, HTTP server 112 may send, to HTTP client 106A, a request for buyer attributes, those attributes including one or more of the buying entity's e-mail addresses. In block 412, one or more e-mail addresses are received from the buying entity. For example, HTTP server 112 may receive, from HTTP client 106A, buyer attributes, including one or more e-mail addresses of user 120A. In block 414, associations are established between the username and the e-mail addresses. For example, database server 114 may establish, in database 116, association between the username and the buyer attributes, including the one or more e-mail addresses.

In block 416, a first e-mail message, which was sent to a buying entity from a selling entity, is received from the buying entity. For example, e-mail client 118 may receive an e-mail message that was forwarded by e-mail client 108A. The e-mail message may be an e-mail message that was originally sent to an e-mail address of user 120A by e-mail client 108B. The e-mail message may contain an offer or advertisement for products or services offered by user 120B. The e-mail message may indicate an original origin e-mail address of user 120B. In block 418, the selling entity's e-mail address is determined from the first e-mail message. For example, a program resident on server device 110 may search the e-mail message for an origin e-mail address that differs from the e-mail address of user 120A. The determined e-mail address may be the e-mail address of user 120B.

In block 420, a second e-mail message is sent to the selling entity. For example, e-mail client 118 may send an e-mail message that is addressed to the e-mail address of user 120B, which was determined in block 418. The e-mail message may inform user 120B that user 120A only acknowledges solicitations that are sent through a specified website. The e-mail message may inform user 120B about how to access the specified website and establish a seller account. The e-mail message may provide a link that, when activated, causes an HTTP client to send a request to HTTP server 112.

According to one embodiment, the e-mail message sent to the selling entity does not contain any machine-searchable text that identifies an e-mail address to which the first e-mail was sent. This prevents selling entities from using e-mail messages received from server device 110 to automatically generate lists of verified e-mail addresses. For example, instead of containing machine-searchable text that identifies the buying entity's e-mail address, the e-mail message may contain an image (e.g., GIF or JPEG) that visually indicates the buying entity's e-mail address. This allows a human being to recognize the buying entity's e-mail address while preventing automated programs from automatically gleaning the buying entity's e-mail address from the e-mail message.

In block 422, a request to establish a seller account is received from the selling entity. For example, HTTP server 112 may receive, from HTTP client 106B, a request to establish a seller account for user 120B. After the selling entity has established a seller account, the selling entity can direct solicitations to the buying entity through server device 110. The buying entity may review such solicitations on the buying entity's terms rather than on the selling entity's terms.

Figure 5:
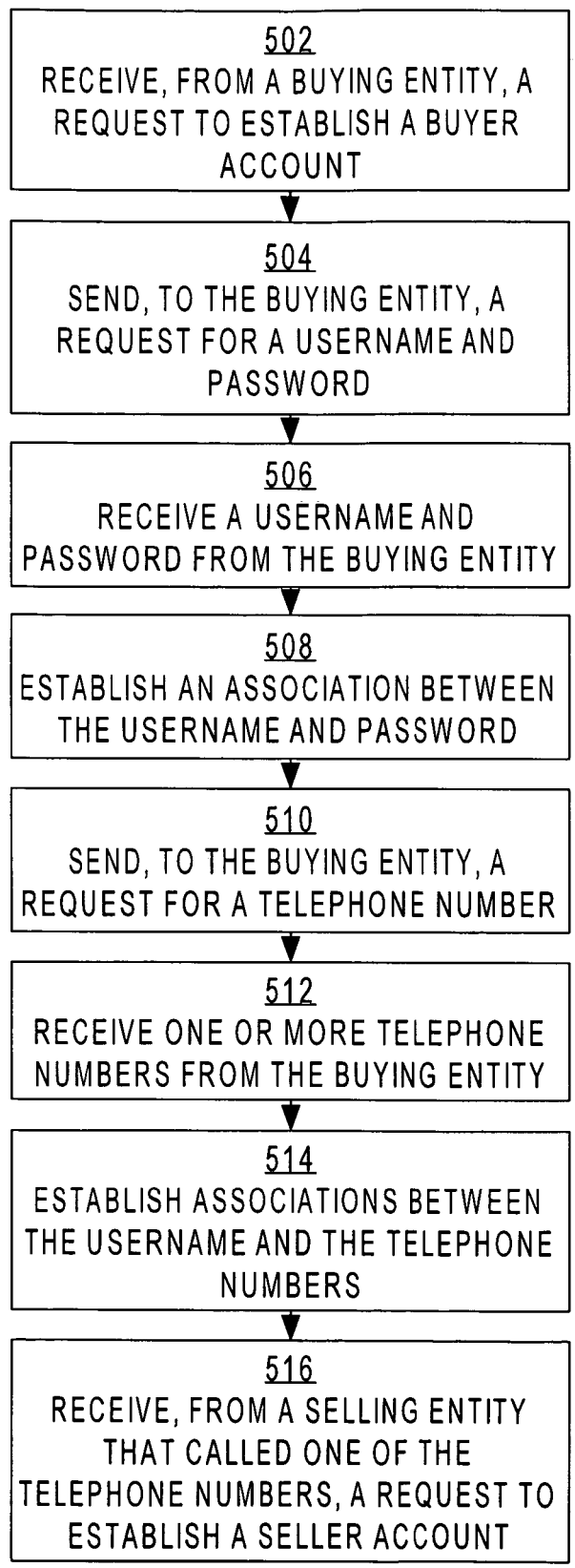
FIG. 5 is a flow diagram that depicts an approach for redirecting telephone solicitations, in accordance with an embodiment of the invention.

FIG. 5 is a flow diagram that depicts an approach for redirecting telephone solicitations, in accordance with an embodiment of the invention. The approach depicted in FIG. 5 may be implemented, for example, by server device 110.

In block 502, a request to establish a buyer account is received from a buying entity. In block 504, a request for a username and password is sent to the buying entity. In block 506, a username and password is received from the buying entity. In block 508, an association is established between the username and the password.

In block 510, a request for one or more telephone numbers is sent to the buying entity. For example, HTTP server 112 may send, to HTTP client 106A, a request for buyer attributes, those attributes including one or more telephone numbers. In block 512, one or more telephone numbers are received from the buying entity. For example, HTTP server 112 may receive, from HTTP client 106A, buyer attributes, including one or more telephone numbers of user 120A. In block 514, associations are established between the username and the one or more telephone numbers. For example, database server 114 may establish, in database 116, an association between the username and the buyer attributes, including the one or more telephone numbers.

Subsequently, when user 120A receives a phone call from a selling entity, user 120A may inform the selling entity that user 120A only acknowledges solicitations that are sent through a specified website. User 120A may convey, to the selling entity, via voice, voicemail, or proxy, a Uniform Resource Locator (URL) of the specified website. For example, if user 120A receives a phone call from user 120B, then user 120A may tell user 120B to direct the latter's browser to "www dot my handshake dot com" instead of calling user 120A. User 120A may then terminate the phone call.

In block 516, a request to establish a seller account is received from a selling entity. For example, HTTP server 112 may receive, from HTTP client 106B, a request to establish a seller account for user 120B. After the selling entity has established a seller account, the selling entity can direct solicitations to the buying entity through server device 110. The buying entity may review such solicitations on the buying entity's terms rather than on the selling entity's terms.

IV. Targeting Solicitations

According to one embodiment, when a selling entity establishes a seller account with server device 110, the selling entity supplies information about the selling entity to server device 110. Such information is included in the selling entity's "seller attributes." Once a selling entity has established a seller account, the selling entity may initiate one or more "profiled campaigns." For each such profiled campaign, the selling entity may specify, to server device 110, (a) one or more product offers and (b) one or more criteria that buying entities' buyer attributes need to satisfy for the one or more product offers to be sent to those buying entities. In this manner, a selling entity can generate different profiles for different kinds of buying entities, and associate one or more separate customized product offers with each profile. Additionally or alternatively, a selling entity may generate an "individual campaign" by submitting, to server device 110, both a product offer and known information about an individual buying entity. Such known information may include a buying entity's telephone number, a buying entity's e-mail address, and/or a buying entity's username, as stored in database 116. Using such known information, server device 110 may determine which buying entity is associated with the known information in database 116, and direct the product offer to that buying entity's list of selling entity solicitations, as described below.

Each buying entity is associated with a separate list of selling entity solicitations. Once a campaign has been initiated, the campaign's associated product offers are placed in a list of selling entity solicitations of each buying entity whose buyer attributes satisfy the seller-specified criteria associated with the campaign. Product offers are called selling entity solicitations when placed within a buying entity's list of selling entity solicitations. Such selling entity solicitations are reviewed by buying entities on the buying entities' terms rather than the selling entity's terms. In this manner, a selling entity can target selling entity solicitations to the kinds of buying entities to which the selling entity wants to sell.

In one embodiment, when a selling entity establishes an account with server device 110, server device 110 requests, from the selling entity, information about how the selling entity was introduced to server device 110. For example, server device 110 may ask the selling entity whether the selling entity was referred to "www dot my handshake dot com". as a consequence of the selling entity calling or e-mailing a buying entity. If the selling entity responds affirmatively, then server device 110 may ask the selling entity for an e-mail address and/or telephone number of that buying entity. If the selling entity supplies an e-mail address and/or telephone number of a particular buying entity, then server device 110 may determine, from associations established in database 116, which particular buying entity is associated with the seller-supplied e-mail address and/or telephone number.

Based on one or more group criteria previously specified by the particular buying entity, server device 110 may determine one or more other buying entities that are probably similar to the particular buying entity in the particular buying entity's opinion. Alternatively, server device 110 may determine one or more other buying entities based on other factors, such as, for example, whether the buying entities are associated with the same industry category. Server device 110 may suggest to the selling entity that the selling entity initiate a campaign in which a selling entity solicitation will be directed to the particular buying entity as well as other buying entities that are associated with buyer attributes that satisfy the particular buying entity's specified group criteria. Server device 110 may accomplish the above without revealing, to the selling entity, the identity or contact information of any buying entity. This helps prevent the selling entity from contacting buying entities through mechanisms other than those provided by system 100.

Figure 6A:
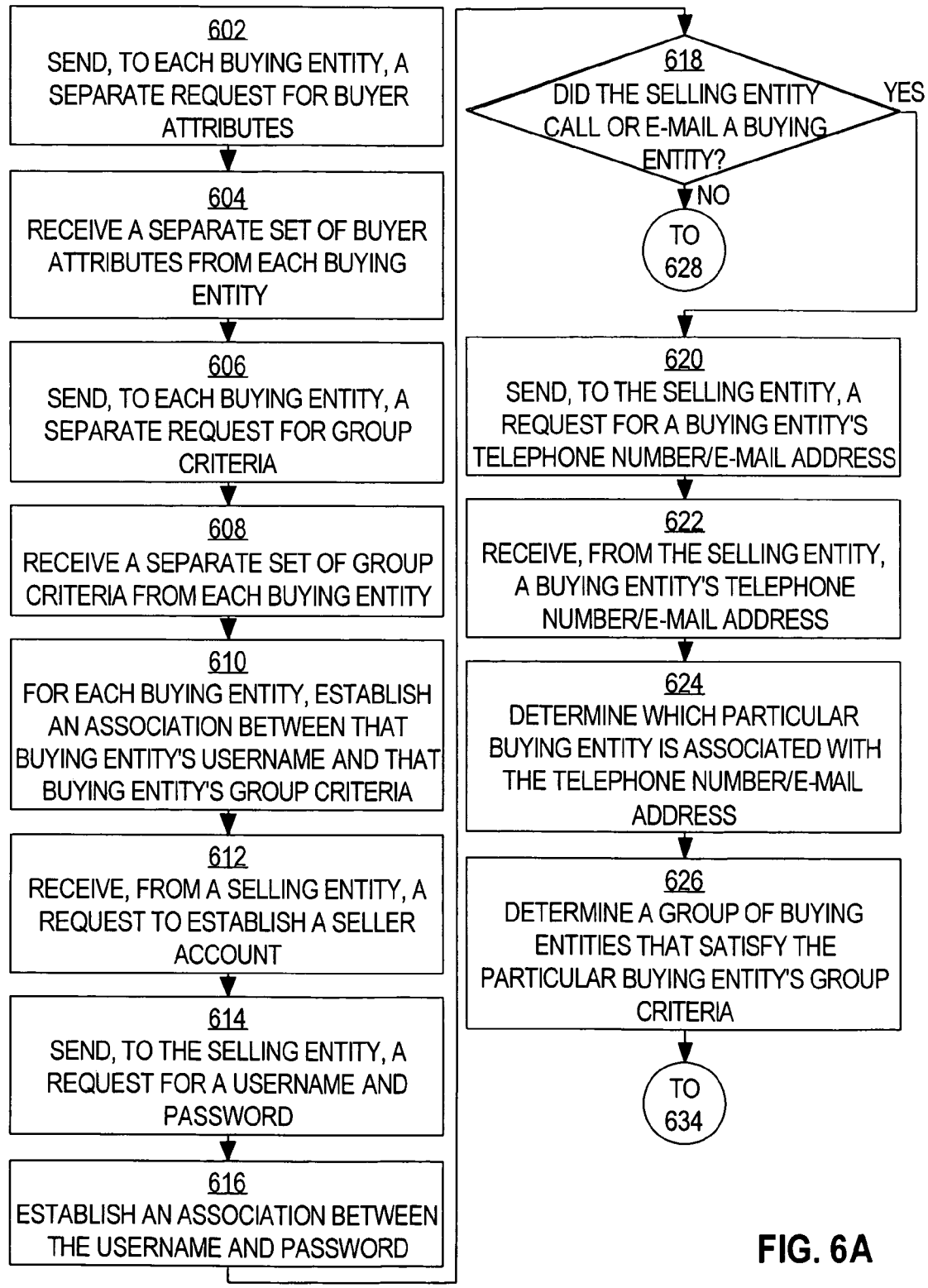
FIG. 6A and FIG. 6B are flow diagrams that depict an approach for targeting solicitations, in accordance with an embodiment of the invention.
Figure 6B:
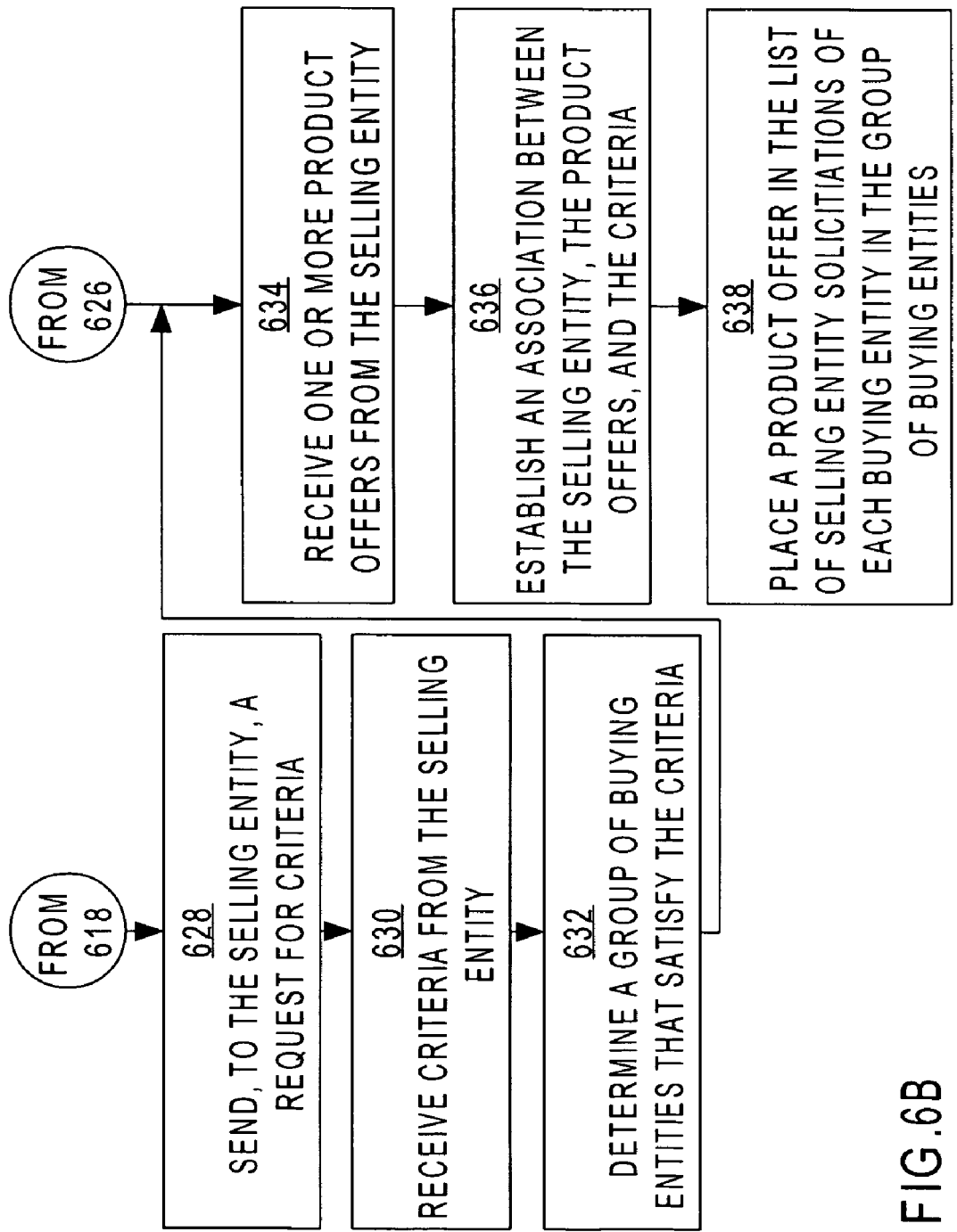

FIG. 6A and FIG. 6B are flow diagrams that depict an approach for targeting solicitations, in accordance with an embodiment of the invention. The approach depicted in FIG. 6A and FIG. 6B may be implemented, for example, by server device 110.

In block 602, for each buying entity of a plurality of buying entities, a separate request for buyer attributes is sent to that buying entity. For example, HTTP server 112 may send, to each of a plurality of HTTP clients, a separate request for buyer attributes. HTTP server 112 may send such requests to HTTP clients in response to those HTTP clients requesting the establishment of buyer accounts. For example, when HTTP server 112 receives, from HTTP client 106A, a request to establish a buyer account for user 120A, HTTP server 112 may responsively send, to HTTP client 106A, a request for buyer attributes of user 120A.

For example, buyer attributes may include a status attribute that indicates whether the buying entity is a profit or non-profit business entity, whether the buying entity does business in the public or private sector, whether the buying entity is self-employed, and/or whether the buying entity is a military or non-military government agency. Buyer attributes may include an industry attribute that indicates one or more industry categories into which the buying entity fits. Such industry categories may be selected from the North American Industrial Classification System (NAICS), for example. Buyer attributes may include a revenue attribute that indicates the buying entity's approximate yearly revenues. Buyer attributes may include a company size attribute that indicates an approximate number of employees that are employed by the buying entity. Buyer attributes may include a market share attribute that indicates the buying entity's approximate percentage share of the market in which the buying entity does business. Buyer attributes may include a location attribute that indicates the buying entity's geographic location.

Additionally, buyer attributes may include a title attribute that indicates the buying entity's title within a business organization (e.g., CEO, CFO, VP, director, manager/supervisor, etc.). Buyer attributes may include a subordinate attribute that indicates approximately how many employees are subordinate to the buying entity within the buying entity's business organization. Buyer attributes may include a budget attribute that indicates an approximate annual monetary budget over which the buying entity has control. Buyer attributes may include a duration attribute that indicates an approximate length of time with which the buying entity has been associated with his current business organization. Buyer attributes may include a personal signing authority attribute that indicates an approximate monetary expense amount that the buying entity is allowed to authorize personally.

Furthermore, buyer attributes may include a decision process attribute that indicates whether the buying entity participates in business decisions individually and/or as part of a committee, and whether those business decisions include purchasing decisions. Buyer attributes may include a buyer role attribute that indicates whether the buying entity makes purchasing decisions, whether the buying entity influences purchasing decisions made by others, whether the buying entity sponsors purchasing decisions made by others, and/or whether the buying entity implements purchasing decisions made by others.

The buyer attributes listed above are attributes that a selling entity might want to consider when deciding whether to target a buying entity for a seller-customized solicitation.

In block 604, for each buying entity of the plurality of buying entities, a separate set of buyer attributes are received from that buying entity. For example, HTTP server 112 may receive, from each of a plurality of HTTP clients, a separate set of buyer attributes. In block 606, for each buying entity of the plurality of buying entities, a separate association is established between that buying entity's username and that buying entity's buyer attributes. For example, database server 114 may establish, in database 116, a separate association between each buying entity's username and that buying entity's buyer attributes.

In block 606, for each buying entity of the plurality of buying entities, a separate request for group criteria is sent to that buying entity. For example, HTTP server 112 may send, to each of the plurality of HTTP clients, a separate request for group criteria. HTTP server 112 may send such requests to HTTP clients in response to those HTTP clients requesting the establishment of buyer accounts.

In block 608, for each buying entity of the plurality of buying entities, a separate set of group criteria are received from that buying entity. For example, HTTP server 112 may receive, from each of a plurality of HTTP clients, a separate set of group criteria. In block 610, for each buying entity of the plurality of buying entities, a separate association is established between that buying entity's username and that buying entity's group criteria. For example, database server 114 may establish, in database 116, a separate association between each buying entity's username and that buying entity's group criteria.

For example, a particular buying entity's group criteria may indicate one or more criteria that other buying entities' buyer attributes need to satisfy in order for those other buying entities to be considered by the particular buying entity to be similar to, or in the same group as, the particular buying entity. By defining group criteria, a particular buying entity defines a group of other buying entities that are, in the particular buying entity's opinion, similar to the particular buying entity. The buying entities that satisfy the group criteria may be referred to as the particular buying entity's "peer community." Server device 110 may constrain each buying entity's group criteria to include only criteria that the buying entity's own buyer attributes satisfy.

In block 612, a request to establish a seller account is received from a selling entity. For example, HTTP server 112 may receive, from HTTP client 106B, a request to establish a seller account for user 120B. In block 614, a request for a username and password is sent to the selling entity. For example, HTTP server 112 may send, to HTTP client 106B, a request for a username and password. In block 614, a username and password is received from the selling entity. For example, HTTP server 112 may receive, from HTTP client 106B, a username and password selected by user 120B. In block 616, an association is established between the username and the password. For example, database server 114 may establish, in database 116, an association between the username and password. As a result, a seller account is established in database 116.

In block 618, it is determined whether the selling entity was introduced to the system as a consequence of the selling entity calling or e-mailing a buying entity. For example, HTTP server 112 may send, to HTTP client 106B, a request for information about how the selling entity was introduced to "www dot my handshake dot com" HTTP server 112 may receive, from HTTP client 106B, information that responsively indicates whether seller 120B was told, in a telephone conversation or an e-mail message, to direct HTTP client 106B to the URL. If the selling entity was introduced to the system as a consequence of the selling entity calling or e-mailing a buying entity, then control passes to block 620. Otherwise, control passes to block 628.

In block 620, a request for a buying entity's telephone number and/or e-mail address is sent to the selling entity. For example, HTTP server 112 may send, to HTTP client 106B, a request for a buying entity's telephone number and/or e-mail address. In block 622, a buying entity's telephone number and/or e-mail address is received from the selling entity. For example, assuming that user 120B previously had solicited user 120A via telephone or an e-mail message, and had been directed to the website as a result, HTTP server 112 may receive, from HTTP client 106B, the telephone number and/or e-mail address of user 120A.

In block 624, a particular buying entity associated with the telephone number and/or e-mail address is determined. For example, database server 114 may query database 116 for buying entities that are associated with the telephone number and/or e-mail address. In response to such a query, database server 114 may identify a particular buying entity that matches the telephone number and/or e-mail address.

In block 626, a group of buying entities that satisfy the particular buying entity's group criteria is determined. For example, database server 114 may query database 116 for buying entities that are associated with buyer attributes that satisfy the particular buying entity's group criteria. In response to such a query, database server 114 may identify a group of buying entities associated with buyer attributes that satisfy the particular buying entity's group criteria. Such a group includes the particular buying entity. In alternative embodiments, the group of buying entities may be determined based on other factors, such as, for example, whether the buying entities are associated with the same industry category. Control then passes to block 634.

Alternatively, in block 628, a request for one or more criteria is sent to the selling entity. For example, HTTP server 112 may send, to HTTP client 106B, a request for one or more criteria. In block 630, one or more criteria are received from the selling entity. For example, HTTP server 112 may receive, from HTTP client 106B, one or more criteria. The criteria define a buyer profile. In block 632, a group of buying entities that satisfy the criteria is determined. For example, database server 114 may query database 116 for buying entities that are associated with buyer attributes that satisfy the criteria. In response to such a query, database server 114 may identify a group of buying entities associated with buyer attributes that satisfy the criteria. Control then passes to block 634.

In block 634, one or more product offers are received from the selling entity. For example, HTTP server 112 may receive, from HTTP client 106, one or more product offers, each of which includes an offer or advertisement for products or services offered by user 120B. The product offer may be customized based on the attributes of the group to which the product offer will be targeted. In block 636, an association is established between the selling entity, the product offer, and the criteria. The criteria may be, for example, the particular buying entity's group criteria used in block 626, or the seller-specified criteria used in block 632. Database server 114 may establish such an association in database 116. As a result, a "campaign," comprising the criteria, is associated with the selling entity along with the one or more product offers associated with the campaign.

In block 638, for each buying entity in the group of buying entities, one or more selling entity solicitations are placed in that buying entity's list of selling entity solicitations. The group may be, for example, the group determined in block 626 or the group determined in block 632. Each such selling entity solicitation comprises a product offer received in block 636. The buying entities may review the selling entity solicitations at their convenience.

A selling entity may be associated with multiple campaigns, each campaign comprising separate criteria, and each campaign being associated with one or more separate product offers. In one embodiment, when a buying entity establishes a new buyer account with server device 110, database server 114 determines whether the buying entity's buyer attributes satisfy the criteria of any campaign. If so, then, for each such campaign, a program resident on server device 110 places that campaign's associated product offers in the buying entity's list of selling entity solicitations. Thus, a particular campaign's associated product offers may be added to the list of selling entity solicitations of a buying entity that establishes a buyer account subsequent to the establishment of the particular campaign. In an alternative embodiment, selling entity solicitations are not automatically added to the lists of selling entity solicitations of buying entities whose buyer attributes are subsequently determined to satisfy a campaign's criteria. Instead, server device 110 may notify a selling entity about the existence of newly identified buying entities that satisfy an existing campaign's criteria, and to whom the existing campaign's associated product offers have not yet been sent. Thereafter, the selling entity may instruct server device 110 whether or not to place those product offers into the newly identified buying entity's lists of selling entity solicitations. In one embodiment, the selling entity is charged a fee in exchange for the placement of the selling entity's product offers into buying entities' lists of selling entity solicitations.

V. Ranking Solicitations

As is described above, each buying entity is associated with a separate list of selling entity solicitations, and selling entity solicitations from one or more selling entities may be placed in one or more buying entities' list of selling entity solicitations. A buying entity may be more interested in some selling entity solicitations and less interested in other selling entity solicitations. In one embodiment, to assist a buying entity in locating selling entity solicitations that are of the greatest interest to the buying entity, system 100 comprises a mechanism for ranking selling entity solicitations in the buying entity's list of selling entity solicitations according to selling entity filter criteria that are both specified by and associated with the buying entity. Each buying entity may be associated with a separate set of selling entity filter criteria.

According to one embodiment, a buying entity may specify, for each filter criterion in that buying entity's associated selling entity filter criteria, whether that filter criterion is a "hard" or a "soft" filter criterion. Selling entity solicitations from selling entities whose seller attributes do not satisfy a buying entity's hard filter criterion may be ranked in a manner that places those selling entity solicitations in a separate portion of that buying entity's list of selling entity solicitations, which only contains selling entity solicitations whose associated seller attributes did not satisfy one or more of that buying entity's hard filter criterion. Thus, a buying entity's list of selling entity solicitations may be separated into two different portions; a first portion containing selling entity solicitations whose associated seller attributes satisfied all of the buying entity's hard filter criterion, and a second portion containing selling entity solicitations whose associated seller attributes failed to satisfy at least one of the buying entity's hard filter criteria. Consequently, a hard filter criterion is a filter criterion that selling entity solicitations' associated seller attributes must satisfy in order for those selling entity solicitations to be placed in the first portion of the list of selling entity solicitations.

Figure 7:
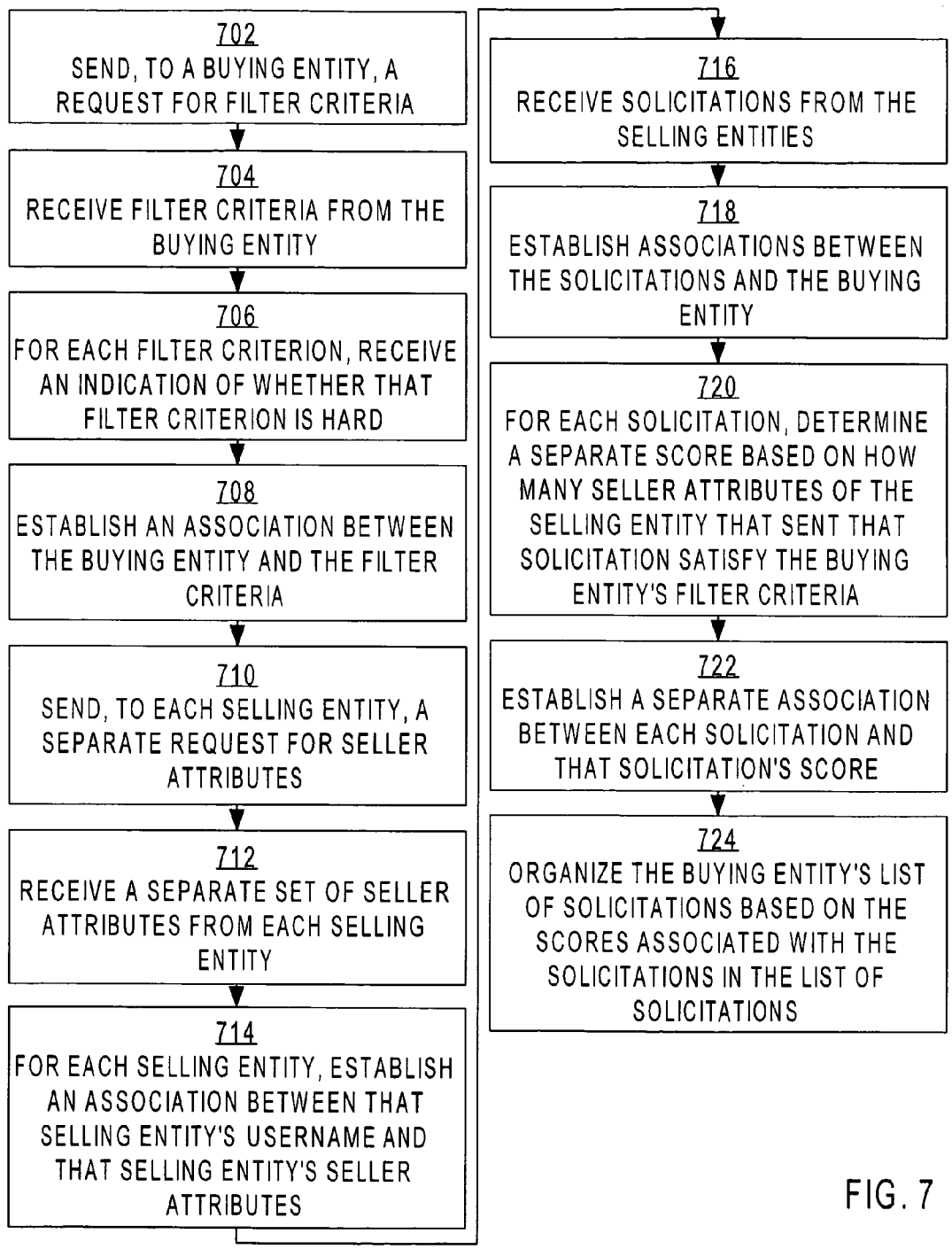
FIG. 7 is a flow diagram that depicts an approach for ranking solicitations, in accordance with an embodiment of the invention.

FIG. 7 is a flow diagram that depicts an approach for ranking selling entity solicitations, in accordance with an embodiment of the invention. The approach depicted in FIG. 7 may be implemented, for example, by server device 110.

In block 702, a request for selling entity filter criteria is sent to the buying entity. For example, HTTP server 112 may send, to HTTP client 106A, a request for one or more selling entity filter criteria. In block 704, one or more selling entity filter criteria are received from the buying entity. For example, HTTP server 112 may receive, from HTTP client 106A, one or more selling entity filter criteria. In block 706, for each criterion of the one or more selling entity filter criteria, an indication of whether that filter criterion is a hard criterion is received. For example, HTTP server 112 may receive, with the one or more selling entity filter criteria, an indication of which of those selling entity filter criteria are hard filter criteria. In block 708, an association is established between the buying entity and the one or more selling entity filter criteria. For example, database server 114 may establish, in database 116, an association between the buying entity's username and the one or more selling entity filter criteria.

In block 710, for each selling entity of a plurality of selling entities, a separate request for seller attributes is sent to that selling entity. For example, HTTP server 112 may send, to each of a plurality of HTTP clients, a separate request for seller attributes. HTTP server 112 may send such requests to HTTP clients in response to those HTTP clients requesting the establishment of seller accounts. For example, when HTTP server 112 receives, from HTTP client 106B, a request to establish a seller account for user 120B, HTTP server 112 may responsively send, to HTTP client 106B, a request for seller attributes of user 120B.

For example, seller attributes may include an industry attribute that indicates one or more industry categories into which the selling entity fits. Such industry categories may be selected from the NAICS, for example. In one embodiment, the selling entity may be charged a fee for each industry category that the selling entity's seller attributes indicate. Seller attributes may include a company age attribute that indicates a number of years that the selling entity's business organization has existed. Seller attributes may include a company revenue attribute that indicates the annual revenues of the selling entity's business organization. Seller attributes may include a company size attribute that indicates a number of employees that are employed by the selling entity's business organization. In addition, seller attributes may include one or more product attributes, each of which indicates one or more product categories into which a separate one of the selling entity's products or services fits. Such product categories may be selected from the Open Directory Project (ODP), for example.

Additionally, seller attributes may a include a status attribute that indicates whether the selling entity is a profit or non-profit business entity, whether the selling entity does business in the public or private sector, whether the selling entity is self-employed, and/or whether the selling entity is a military or non-military government agency. Seller attributes may include an origin country attribute that indicates a nation with which the selling entity is associated (e.g., by incorporation therein or by having a principal place of business therein). Seller attributes may include a certification attribute that indicates one or more certifications that the selling entity has obtained (e.g., ISO 9000, ISO 14000, etc.). Seller attributes may include a customer attribute that indicates the identities of one or more other business organization with which the selling entity does business. Seller attributes may include a customer proportion attribute that indicates, for one or more other business organization, how much of the selling entity's business is attributable to each of those business organizations.

Furthermore, seller attributes may include a support locations attribute that indicates one or more geographic locations in which the selling entity offers customer support. Seller attributes may include a resources attribute that indicates whether the selling entity can provide a product or service demonstration, whether the selling entity can arrange peer-to-peer executive meetings, whether the selling entity provides a no-obligation consultation, and/or whether the selling entity offers full-service implementation.

The seller attributes listed above are attributes that a buying entity might want to consider when deciding whether to further investigate a selling entity's solicitations.

In block 712, for each selling entity of the plurality of selling entities, a separate set of seller attributes are received from that selling entity. For example, HTTP server 112 may receive, from each of a plurality of HTTP clients, a separate set of seller attributes. In block 714, for each selling entity of the plurality of selling entities, a separate association is established between that selling entity's username and that selling entity's seller attributes. For example, database server 114 may establish, in database 116, a separate association between each selling entity's username and that selling entity's seller attributes.

In block 716, one or more selling entity solicitations are received from one or more selling entities. For example, HTTP server 112 may receive, from each of a plurality of HTTP clients, a separate set of campaigns, each campaign comprising a separate solicitation. In block 718, for each of the one or more selling entity solicitations, a separate association is established between that selling entity solicitation and the buying entity. For example, for each selling entity solicitation directed to a particular buying entity, database server 114 may establish an association between that selling entity solicitation and the particular buying entity. In this manner, selling entity solicitations may be placed in a buying entity's list of selling entity solicitations.

In block 720, for each of the one or more selling entity solicitations, a separate score is determined based on how many of the seller attributes of the selling entity that sent that selling entity solicitation satisfy the buying entity's selling entity filter criteria. For example, a program resident on server device 110 may determine, for each selling entity solicitation, a separate score based on the buying entity's selling entity filter criteria. According to one embodiment, if any of a selling entity's seller attributes fail to satisfy at least one of the buying entity's hard filter criteria, then that selling entity's solicitations are placed in a portion of the buying entity's list of selling entity solicitations that only contains selling entity solicitations sent by selling entities whose seller attributes failed to satisfy at least one of the buying entity's hard filter criteria.

In block 722, for each of the one or more selling entity solicitations, an association is established between that selling entity solicitation and the score determined for that selling entity solicitation. For example, database server 114 may establish such associations in database 116. Because different buying entities may be associated with different selling entity filter criteria, a selling entity solicitation may be associated with one score when placed in one buying entity's list of selling entity solicitations, and another score when placed in another buying entity's list of selling entity solicitations. Thus, in database 116, a particular selling entity solicitation may be associated with multiple buying entity-and-score pairs.

In block 724, the buying entity's list of selling entity solicitations is organized based on the scores associated with the selling entity solicitations in the list of selling entity solicitations. For example, database server 114 may sort a buying entity's associated selling entity solicitations by score, thereby producing a sorted list of selling entity solicitations for the buying entity. The buying entity may review the buying entity's sorted list of selling entity solicitations at the buying entity's convenience. Selling entity solicitations from selling entities whose seller attributes satisfy most of the buying entity's selling entity filter criteria appear towards the top of the buying entity's list of selling entity solicitations when the buying entity reviews the list of selling entity solicitations. The entire content of the selling entity solicitation does not need to be displayed in the list; by activating a link associated with a selected selling entity solicitation, the buying entity can view detailed contents of the selling entity solicitation. The detailed contents may indicate the seller attributes of the selling entity that sent the selling entity solicitation, and, for each such seller attribute, whether that seller attribute satisfied that buying entity's filter criteria. In one embodiment, the list of selling entity solicitations is not necessarily ordered. In one embodiment, the scores associated with the selling entity solicitations are sent in addition to the selling entity solicitations, and are indicated in the buying entity's list of selling entity solicitations.

VI. Notification Preferences

As is described above, buying entities may review their list of selling entity solicitations on the buying entities' terms rather than the selling entities' terms. Thus, in one embodiment, a buying entity is not necessarily notified every time that a new selling entity solicitation has been placed in that buying entity's list of selling entity solicitations. Instead, in one embodiment, each buying entity may specify separate notification preferences. For example, notification preferences may be requested and received by HTTP server 112. When notification preferences are received from a buying entity, database server 114 establishes an association between that buying entity's username and those notification preferences.

For example, notification preferences may indicate a frequency at which a buying entity wishes to be notified about whether any new selling entity solicitations have been placed in the buying entity's list of selling entity solicitations. At the specified frequency (e.g., once per day), a program resident on server device 110 may determine whether any selling entity solicitations have been added to the buying entity's list of selling entity solicitations since the last time that the buying entity reviewed the list of selling entity solicitations. If selling entity solicitations have been added since the last time, then server device 110 may generate a notification and send the notification to the buying entity.

For example, e-mail client 118 may generate an e-mail message that indicates that new selling entity solicitations have been added to a buying entity's list of selling entity solicitations since the last time that the buying entity reviewed the list of selling entity solicitations. Optionally, the e-mail message may indicate a number of such new selling entity solicitations, and/or the last time that the buying entity reviewed the list of selling entity solicitations. In one embodiment, the e-mail message contains a link that, when activated, causes the buying entity's browser (e.g., HTTP client 106A) to be directed to a page that indicates the buying entity's sorted list of selling entity solicitations. In the sorted list of selling entity solicitations, new selling entity solicitations may be visibly distinguished from selling entity solicitations that were already in the buying entity's list of selling entity solicitations at the last time that the buying entity received the list of selling entity solicitations.

E-mail client 118 may send such an e-mail message to an e-mail address that is associated, in database 116, with the buying entity's username. An e-mail client resident on a client device may receive the e-mail message and display the contents of the e-mail message to a buying entity.

Whenever a list of selling entity solicitations is sent to a buying entity's HTTP client, database server 114 may establish, in database 116, an association between the buying entity's username and a time at which the list of selling entity solicitations was most recently sent. Each selling entity solicitation may be associated with a timestamp that indicates a time at which the selling entity solicitation was added to a particular list of selling entity solicitations. By comparing selling entity solicitations' timestamps with the time at which a list of selling entity solicitations was last sent, programs resident on server device 110 may determine which selling entity solicitations are new to a particular buying entity's list of selling entity solicitations.

VII. Acting on Solicitations

According to one embodiment, at a buying entity's request, a program resident on server device 110 dynamically generates, and sends to the buying entity's HTTP client, a page that contains the buying entity's list of selling entity solicitations, ordered by the scores associated with each selling entity solicitation therein. The page also may contain, next to each such selling entity solicitation, one or more controls that, when activated, cause indicated actions to be performed relative to that selling entity solicitation. For example, next to each selling entity solicitation, the page may display button controls labeled "invite seller," "forward," "question seller," "delete," "get referral," and "improve filters."

A user may activate these controls using an HTTP client. In one embodiment, a buying entity's activation of the "invite seller" control causes an invitation to be sent to the selling entity that sent the selling entity solicitation associated with the activated "invite seller" control. For example, e-mail client 118 may generate an e-mail message and send the e-mail message to an e-mail address associated with the selling entity's username in database 116. The e-mail message may inform the selling entity that the buying entity is interested in receiving further contact from the selling entity. In one embodiment, the e-mail message indicates contact information for the buying entity. The contact information may indicate the buying entity's identity. The selling entity may use the contact information to contact the buying entity through mechanisms other than those provided by system 100.

In one embodiment, after such an invitation has been sent, the buying entity and the selling entity may be given one or more opportunities to rate each other. Such ratings may be requested and received by HTTP server 112. When a rating for a selling entity is received from a buying entity, an association is established, in database 116, between the selling entity, the rating, and the buying entity that sent the rating. Similarly, when a rating for a buying entity is received from a selling entity, an association is established, in database 116, between the buying entity, the rating, and the selling entity that sent the rating. Ratings may be numerical values within a specified range.

In one embodiment, buying entities and selling entities can request and receive each other's overall and detailed ratings. For example, if five ratings of a selling entity have been received from five different buying entities, then, in response to a buying entity's request, the average of the five ratings may be determined and sent to the buying entity. Buying entities and selling entities can consider such ratings when deciding whether to do business with each other. Both buying entities and selling entities may be associated with overall and detailed ratings in database 116.

As is described above, in one embodiment, a buying entity may define a group of buying entities by specifying one or more group criteria. Group criteria specified by a buying entity are associated with that buying entity's username in database 116. In one embodiment, a particular buying entity may request a group rating for a specified selling entity. In order to determine the group rating, a group of buying entities is determined based on the particular buying entity's group criteria. The group contains only those buying entities that are associated with buyer attributes that satisfy the particular buying entity's group criteria. Ratings of the selling entity, submitted by buying entities within the group, are averaged. The resulting group rating of the selling entity may be sent to the particular buying entity. A selling entity's overall rating may be higher or lower than the selling entity's average rating by a narrower group of buying entities.

In one embodiment, a first buying entity's activation of the "forward" control causes the particular selling entity solicitation associated with the activated "forward" control to be placed in a second buying entity's list of selling entity solicitations. Using an HTTP client, the first buying entity may specify the identity of the second buying entity. HTTP server 112 may receive the identity of the second buying entity from the first buying entity's HTTP client. Database server 114 may cause the particular selling entity solicitation to be associated with the second buying entity's list of selling entity solicitations. As is described above, the second buying entity may be associated with different selling entity filter criteria than the first buying entity. Therefore, when selling entity solicitations in the second buying entity's list of selling entity solicitations are scored and ranked, the particular selling entity solicitation may be associated with a different score than the score with which the particular selling entity solicitation was associated in the first buying entity's list of selling entity solicitations. The second buying entity may review the second buying entity's ordered list of selling entity solicitations, including the particular selling entity solicitation, at the second buying entity's convenience.

In one embodiment, a buying entity's activation of the "question seller" control causes a buying entity-specified question to be sent to the selling entity that sent the selling entity solicitation associated with the activated "question seller" control. According to one embodiment, the buying entity's identity is not revealed to the selling entity when the question is sent to the selling entity. In one embodiment, the buying entity specifies which of the buying entity's buyer attributes may be revealed to the selling entity when the question is sent to the selling entity. The selling entity may send an answer to the buying entity, even without knowing the buying entity's identity, through a mechanism provided by system 100. For example, after activating a "question seller" control associated with a selling entity solicitation, user 120A may specify a question using HTTP client 106A. HTTP client 106A may send the question, along with an identifier of the selling entity solicitation, to HTTP server 112A. Database server 114 may query database 116 to determine the selling entity associated with the selling entity solicitation identifier. E-mail client 118 may generate a first e-mail message that contains the question, and send the first e-mail message to an e-mail address that is associated with the selling entity's username in database 116. In one embodiment, the first e-mail message does not reveal the identity or e-mail address of the buying entity. Assuming that the selling entity is user 120B, for example, the first e-mail message may be received by e-mail client 108B. User 120B may use e-mail client 108B to compose a second, reply e-mail message that contains an answer to the question. E-mail client 108B may send the second e-mail message to the e-mail address from which the first e-mail message was sent. E-mail client 118 may receive the second e-mail message and forward the second e-mail message to an e-mail address that is associated with the buying entity's username in database 116. E-mail client 108A may receive the second e-mail message and display the answer to user 120A.

In one embodiment, a buying entity's activation of the "delete" control causes the selling entity solicitation associated with the activated "delete" control to be removed from the buying entity's list of selling entity solicitations. Selling entities that sent selling entity solicitations removed in this manner become "prior solicitors" associated with the buying entity. Each buying entity may be associated with a separate set of prior solicitors. As is described above, a selling entity's seller attributes may include an industry attribute that indicates one or more industry categories into which the selling entity fits, and one or more product attributes that indicate one or more product categories into which the selling entity's products and/or services fit. In one embodiment, a buying entity can search for selling entities by specified industry categories and/or specified product categories. In response to such a search, server device 110 sends, to the buying entity's HTTP client, a result list of selling entities whose seller attributes match the buying entity-specified industry and/or product categories. In the result list, selling entities that are prior solicitors relative to the buying entity are distinguished from selling entities whose selling entity solicitations have never been placed in the buying entity's list of selling entity solicitations. In the result list, a date on which prior solicitors sent selling entity solicitations to the buying entity may be indicated.

In one embodiment, a buying entity can save specified industry categories and/or specified product categories as a "search agent" of that buying entity. When such a search agent is established, server device 110 notifies the buying entity about the existence of new selling entities that are associated with seller attributes that match the specified industry categories and/or product categories subsequent to the establishment of the search agent.

For example, in response to the activation of a "delete" control associated with a particular selling entity solicitation, HTTP client 106A may send, to HTTP server 112, information indicating the identity of the particular selling entity solicitation. Database server 114 may establish an association, in database 116, between the buying entity that activated the control and the selling entity that sent the selling entity solicitation. As a result, the selling entity is established as a prior solicitor of the buying entity. Additionally, database server 114 may remove an association, in database 116, between the selling entity solicitation and the list of selling entity solicitations of the buying entity. As a result, the selling entity solicitation is no longer contained in the buying entity's list of selling entity solicitations.

In one embodiment, a particular buying entity's activation of a "get referral" control associated with a selling entity solicitation causes the identities of one or more other buying entities to be sent to the particular buying entity's HTTP client. The other buying entities are those that have agreed to serve as referrals for the selling entity that sent the selling entity solicitation. For example, a selling entity may ask one or more other users to serve as referrals for the selling entity. The selling entity may instruct the other users to establish buyer accounts with server device 110. Those users that do establish buyer accounts may be presented with the option of specifying one or more selling entities for which those users are willing to serve as referrals. In one embodiment, when a buying entity specifies a selling entity for which he will serve as a referral, database server 114 establishes an association, in database 116, between that buying entity and the referral list of the selling entity. HTTP server 112 may send the contents of a selling entity's referral list to a buying entity in response to a request from the buying entity.

In one embodiment, a buying entity's activation of an "improve filters" control associated with a selling entity solicitation causes a list of the buying entity's associated selling entity filter criteria to be sent to the buying entity. For each filter criterion in the selling entity filter criteria, the list indicates whether the selling entity solicitation satisfied that filter criterion. Based on the information represented in the list, the buying entity may add or remove selling entity filter criteria from the buying entity's associated selling entity filter criteria. In this manner, a buying entity can customize its selling entity filter criteria so that, in the future, similar selling entity solicitations will be scored higher or lower. After the adjusted selling entity filter criteria have been associated with the buying entity in database 116, selling entity solicitations in the buying entity's list of selling entity solicitations may be re-scored according to the adjusted selling entity filter criteria. The buying entity's list of selling entity solicitations, organized according to the new scores, may be sent to the buying entity's HTTP client.

VIII. Needcasts™ and Agents

In one embodiment, system 100 includes a mechanism that allows a buying entity to generate Needcasts™ that are sent to multiple selling entities. A Needcast™ identifies a buying entity's need, and invites recipient selling entities to respond to the Needcast™ if those selling entities are able to fulfill the need. In one embodiment, system 100 includes a mechanism that allows a selling entity to generate "agents" that filter Needcasts™ based on whether the selling entity is likely to be able to fulfill the needs specified in those Needcasts™. An agent ignores Needcasts™ that do not satisfy selling entity-specified criteria, and presents, to the selling entity, only Needcasts™ that satisfy the selling entity-specified criteria.

Figure 8:
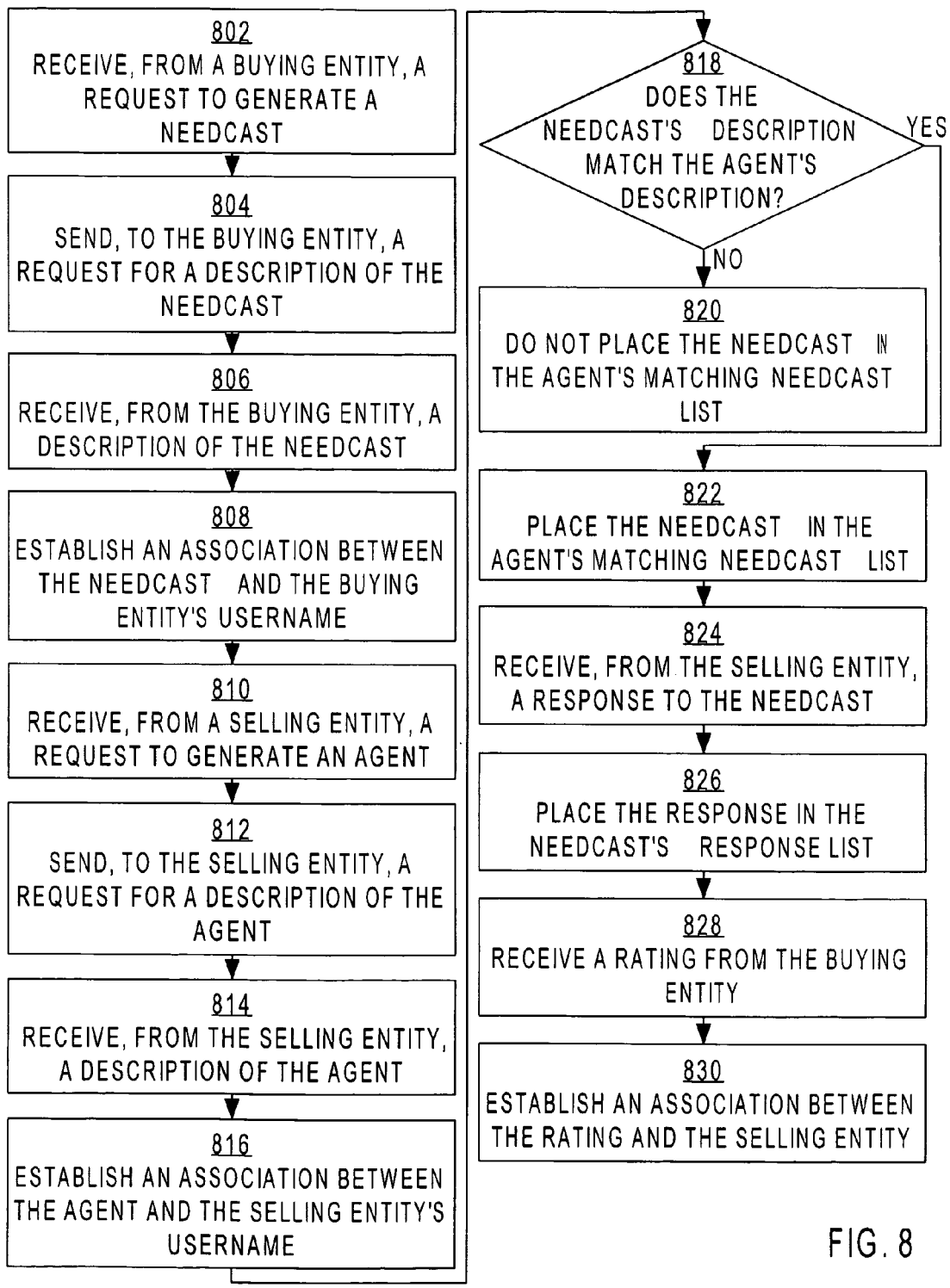
FIG. 8 is a flow diagram that depicts an approach for broadcasting buyer needs, in accordance with an embodiment of the invention.

FIG. 8 is a flow diagram that depicts an approach for broadcasting buyer needs, in accordance with an embodiment of the invention. The approach depicted in FIG. 8 may be implemented, for example, by server device 110.

In block 802, a request to generate a Needcast™ is received from a buying entity. For example, HTTP server 112 may receive, from HTTP client 106A, a request to generate a Needcast™ for user 120A. In block 804, a request for a description of the Needcast™ is sent to the buying entity. For example, HTTP server 112 may send, to HTTP client 106A, a request for a description of the Needcast™. In block 806, a description of the Needcast™ is received from the buying entity. For example, HTTP server 112 may receive, from HTTP client 106A, a description of the Needcast™ by user 120A. In block 808, an association is established between the Needcast™ and the buying entity's username. For example, database server 114 may establish, in database 116, an association between the Needcast™, including the description, and the buying entity's username. A buying entity may generate multiple different Needcasts™ in this manner. In one embodiment, Needcasts™ do not identify the identities of the buying entities that generated those Needcasts™. This helps prevent selling entities from soliciting buying entities using mechanisms outside of those provided by system 100.

The request for the description of the Needcast™ may include a request for multiple separate information items. For example, such information items may include a Needcast™ name, a general description of the buying entity's need, a list of desired deliverables, a list of companies that may be able to fulfill the need, a list of positive keywords, a list of negative keywords, a selection of one or more categories into which the need fits, a selection of one or more categories that indicate a reason for the Needcast™, an indication of the urgency of the need, and/or a selection of one or more categories that describe the buying entity's role in relation to the Needcast™ (e.g., end user, sponsor for adoption, decision influencer, decision maker, etc.). The description of the Needcast™ may include one or more of these and/or other information items. The information items received from the buying entity may be stored in association with the Needcast™.

In one embodiment, the selection of categories into which the need fits may include categories such as assets, career, environment, knowledge/information, legal, money, people, relationships, soft values, time, tangible, intangible, other, etc. In one embodiment, the categories are organized into a hierarchical taxonomy of need categories, where each need category may be a parent of one or more need subcategories, each of those subcategories may be a parent of one or more further subcategories, and so on, through multiple levels. In one embodiment, the need categories and subcategories do not include specific products and/or services. Using the hierarchical taxonomy, a buying entity may select, from among multiple broad need categories, a broad need category into which the buying entity's need fits. In the hierarchical taxonomy, the selected broad need category may be parent to multiple narrower need subcategories. The buying entity may select, from among the narrower subcategories of the selected broad need category, a particular narrower need subcategory into which the buying entity's need fits. The selected narrower need subcategory may be parent to multiple further need subcategories. In this manner, a buying entity may iteratively narrow the need categories into which the buying entity's need fits, until the buying entity has selected a branch of the hierarchical taxonomy that accurately and specifically describes the buying entity's need. A particular need category may appear in multiple branches of the hierarchical taxonomy.

In one embodiment, positive and negative keywords signal to a selling entity whether that selling entity should respond to a Needcast™. A selling entity may see the positive and negative keywords associated with a Needcast™. As a result, selling entities that are involved in activities associated with a negative keyword are warned to not respond to Needcasts™ that contain that negative keyword. Conversely, selling entities that are involved in activities associated with a positive keyword are encouraged to respond to Needcasts™ that contain the positive keyword.

In block 810, a request to generate an agent is received from a selling entity. For example, HTTP server 112 may receive, from HTTP client 106B, a request to generate an agent for user 120B. In block 812, a request for a description of the agent is sent to the selling entity. For example, HTTP server 112 may send, to HTTP client 106B, a request for a description of the agent. In block 814, a description of the agent is received from the selling entity. For example, HTTP server 112 may receive, from HTTP client 106A, a description of the agent by user 120B. In block 816, an association is established between the agent and the selling entity's username. For example, database server 114 may establish, in database 116, an association between the agent, including the description, and the selling entity's username. A selling entity may generate multiple different agents in this manner.

Like the request for a description of a Needcast™, the request for the description of an agent may include a request for multiple separate information items. Such information items may include one or more of the information items, listed above, which are requested in a description of a Needcast™.

In block 818, it is determined whether the Needcast's™ description matches the agent's description. For example, a program resident on server device 110 may compare the Needcast's™ selection of categories with the agent's selection of categories. Comparisons may be made between each Needcast™ and each agent. Comparisons may be made whenever a new Needcast™ or a new agent is generated. In one embodiment, if a Needcast's™ selection of categories matches an agent's selection of categories, then the Needcast's™ description matches the agent's description. If the Needcast's™ description matches the agent's description, then control passes to block 822. Otherwise, control passes to block 820.

Each agent may be associated with a separate matching Needcast™ list that contains Needcasts™ having descriptions that match that agent's description. In block 820, the Needcast™ is not placed in the agent's matching Needcast™ list.

Alternatively, in block 822, the Needcast™ is placed in the agent's matching Needcast™ list. This may be accomplished, for example, by establishing an association, in database 116, between the Needcast™ and the agent. At the selling entity's convenience, the selling entity may request, from server device 110, Needcasts™ that are contained in a specified agent's matching Needcast™ list. In one embodiment, the selling entity may view the description of each such Needcast™, but not the identity of the buying entity that sent that Needcast™. Based on a Needcast's™ description, the selling entity may decide to respond to the Needcast™. The selling entity may be informed that responding to a Needcast™ gives a buying entity an opportunity to rate the selling entity.

In block 824, if the selling entity decides to respond to the Needcast™, then a response to the Needcast™ is received from the selling entity. For example, HTTP server 112 may receive, from HTTP client 106B, a response to the Needcast™. The response may be structured similarly to a selling entity solicitation that is associated with a campaign. The selling entity may specify the content of the response.

Each Needcast™ may be associated with a separate "response list" that contains responses to that Needcast™. In block 826, the response to the Needcast™ is placed in the Needcast's™ response list. This may be accomplished, for example, by establishing an association, in database 116, between the response and the Needcast™. At the buying entity's convenience, the buying entity may request, from server device 110, responses that are contained in a specified Needcast's™ response list. The buying entity may view the content of each such response. Each such response is associated with the selling entity that sent that response.

Similar to the scoring and ranking of selling entity solicitations in a list of selling entity solicitations, in one embodiment, the responses in a Needcast's™ response list are scored according to how many seller attributes of the selling entities that sent those responses satisfy the buying entity's selling entity filter criteria. The responses are ranked and sorted by associated scores. Thus, the highest-scoring responses may be located toward the top of the response list, and the lowest-scoring responses may be located toward the bottom of the response list.

In one embodiment, a buying entity may specify a separate, customized set of selling entity filter criteria for each Needcast™. For example, the buying entity may specify a customized set of selling entity filter criteria at the time that the buying entity generates the Needcast™. If a customized set of selling entity filter criteria has been specified for a Needcast™, then that customized set may be associated with the Needcast™ in database 116. Responses to a Needcast™ that has been associated with a customized set of selling entity filter criteria may be scored and ranked according to the customized set of selling entity filter criteria instead of the buying entity's general selling entity filter criteria.

In block 828, if the buying entity decides to rate the selling entity, then a rating is received from the buying entity. For example, HTTP server 112 may receive, from HTTP client 106A, a rating that is based on the response to the Needcast™. In block 830, an association is established between the rating and the selling entity. The rating is considered with others of the selling entity's ratings when determining the selling entity's overall rating.

In one embodiment, if the buying entity is interested in the selling entity's response, then the buying entity may invite the selling entity to contact the buying entity. This may be accomplished in a manner similar to that described above with reference to a buying entity's activation of an "invite seller" control associated with a selling entity solicitation.

IX. Pipeline Phases and Ratings

In one embodiment, when a buying entity invites a selling entity to contact the buying entity, as described above, an association is established between the buying entity, the selling entity, and a phase. For example, the first phase after the invitation might be a "presentation" phase. In this manner, the buying entity and the selling entity enter a "pipeline." According to one embodiment, a buying entity and a selling entity may enter a pipeline as a result of any of several actions that may be taken by either the buying entity or the selling entity. For example, a buying entity and a selling entity may enter a pipeline as a result of the selling entity responding to the buying entity's Needcast™. For another example, a buying entity and a selling entity may enter a pipeline as a result of the buying entity directly requesting information from the selling entity. When the association between the buying entity and the selling entity has been established, a timer may be started. For example, the timer might be set to expire when a specified number of days have passed since the timer was started.

At the expiration of the timer, both the buying entity and the selling entity may be asked whether a specified event between the buyer and the seller took place. For example, in the "presentation" phase, HTTP server 112 may request, from the buying entity and the selling entity, information that indicates whether the selling entity made a presentation to the buying entity. If both entities respond affirmatively, then both are asked to submit a rating for the other's participation in the specified event. The submitted ratings may be associated with the buying and selling entities.

After the buying entity and the selling entity have (optionally) rated each other, both entities may be asked whether they wish to progress to a next phase. If both respond affirmatively, then the phase associated with the buying entity and the selling entity may be updated to become a subsequent phase in the pipeline. For example, an "investigation" phase may follow the "presentation" phase, and an "implementation" phase may follow the "investigation" phase.

For each phase, the above process may be repeated. Thus, in each phase, the buying entity and the selling entity may rate each other. In one embodiment, ratings submitted in later phases are weighted to affect an entity's overall rating more than ratings submitted in earlier phases.

In one embodiment, when a timer has expired, either the buying entity or the selling entity may request an extension of time from the other. If the other grants the request, then the timer may be re-started with a specified value. Thus, with the consent of both a buying entity and a selling entity, ratings for a particular phase may be deferred.

In one embodiment, a particular buying entity may specify one or more other buying entities to be "trusted friends" of the particular buying entity. Trusted friends of the particular buying entity are associated with the particular buying entity in database 116. Similarly, other buying entities may designate the particular buying entity to be a trusted friend of those other buying entities. In one embodiment, when a particular buying entity gives a sufficiently positive rating to a selling entity, the particular buying entities' trusted friends are notified that the positive rating was issued to the selling entity. This may encourage the trusted friends to do business with the selling entity.

In one embodiment, a first selling entity may request the buying entity's permission to have a second selling entity replace the first selling entity in the buying entity's pipeline. For example, during the "implementation" phase, a first selling entity may request the buying entity's permission to allow a second selling entity to replace the first selling entity. If the buying entity grants this permission, and if the second selling entity has previously indicated a willingness to be a delegate of the first selling entity, then the second selling entity takes the place of the first selling entity in the buying entity's pipeline. Both buying entities and selling entities may be associated, in database 116, with other entities as delegates of those other entities.

X. Ongoing Relationship Phase

Buying entities and selling entities may engage in a continuing relationship with each other using the system described above. As is discussed above, through this system-maintained relationship, buying entities and selling entities may proceed, with their mutual consent, through various phases of a multi-phase "pipeline." At each phase, buying and selling entities optionally may rate each other. In one embodiment, these phases comprise, in order, an "information-gathering" phase, a "presentation" phase, an "investigation" phase, an "implementation" phase, and an "ongoing relationship" phase.

An ongoing relationship phase may be important to a buying entity for several reasons. After a buying entity has purchased a selling entity's products or services, and after the selling entity has supplied the purchased products or services to the buying entity, the buying entity may experience some dissatisfaction with those products or services. Unfortunately, in some real-life circumstances, selling entities sometimes misrepresent, innocently or intentionally, the products or services that they offer, and the buying entity might not discover the misrepresentation until after a considerable amount of time has passed. Thus, buying entities would benefit from a means of making selling entities accountable, over the long term, to the buying entities to which the selling entities sell.

Thus, in one embodiment, while the ratings given in the phases preceding the "ongoing relationship" phase in the pipeline are one-time ratings that might be irreversible, the ratings given in the "ongoing relationship" phase are mutable. In one embodiment, the system described above provides a buying entity and/or a selling entity with the ability and opportunity to change the rating that one gave to the other in the "ongoing relationship" phase. The knowledge that a buying entity can change the "ongoing relationship" rating if some undesirable event occurs in the future motivates selling entities to be supportive of their products and services over the long term, and encourages selling entities to exercise care in how they represent their products and services.

In one embodiment, the "ongoing relationship" rating can be changed as often as the rating-giver desires. Thus, if a selling entity's product breaks, a buying entity may give the selling entity a low rating, but if the selling entity subsequently repairs or replaces the product, then the buying entity may change the rating to a high rating.

In one embodiment, the system described above tracks and maintains, for each selling entity, a number of "ongoing relationship" phases in which that selling entity is involved. In one embodiment, the system provides, to a buying entity, a page that indicates, for each of one or more selling entities, the number of "ongoing relationship" phases in which the selling entity is engaged with any buying entity. For example, the number of "ongoing relationships" in which a particular selling entity is involved may be represented next to each of the particular selling entity's solicitations in a page that displays a buying entity list of selling entity solicitations, as discussed above.

For example, a page may display, in a list, a selling entity solicitation from selling entity "A" and a selling entity solicitation from selling entity "B." Next to the solicitation from selling entity "A," the page may display the number of "ongoing relationship" phases in which selling entity "A" is currently engaged, and next to the solicitation from selling entity "B," the page may display the number of "ongoing relationship" phases in which selling entity "B" is currently engaged.

A buying entity may use such numbers as a gauge to measure the reliability of each such selling entity. Buying entities may be naturally motivated to seek the services and products of selling entities that are engaged in larger quantities of "ongoing relationship" phases, if the ratings of those selling entities are also high. Buying entities may be naturally inclined to avoid the services and products of even highly rated selling entities if those selling entities appear to be reluctant to engage in many "ongoing relationship" phases with buying entities with which the selling entities have done business.

Thus, the "ongoing relationship" phase can be a valuable credential and advertising tool to selling entities. Selling entities that engage in many "ongoing relationship" phases and retain high ratings become distinguished, in buying entities' eyes, from other selling entities. Selling entities are motivated to enter the "ongoing relationship" phase with as many buying entities as possible. Thus, both buying entities and selling entities benefit from the "ongoing relationship" phase and the mutable rating that it offers.

In one embodiment, whenever a selling entity moves from one phase to another in the "pipeline" described above, the selling entity is charged a fee by the owner and/or operator of the automated system described above. In one embodiment, the fees charged for each successive phase are higher than the fees charged in the previous phases. In one embodiment, a selling entity that is engaged in an "ongoing relationship" phase with a buying entity is charged a periodic fee, similar to a subscription fee. Such fees motivate the owner and/or operator of the system described above to provide and operate the system.

In one embodiment, the system described above provides a selling entity with the option of withdrawing from an "ongoing relationship" phase. If a selling entity opts to withdraw from a particular "ongoing relationship" phase, then the selling entity is no longer charged the periodic fee, if any, that is associated with that phase, but the selling entity's associated rating and the number of "ongoing relationship" phases in which the selling entity is engaged may be modified to reflect the fact that the selling entity is no longer engaged in that particular "ongoing relationship" phase. A selling entity may optionally withdraw from some "ongoing relationship" phases with some buying entities while remaining in other "ongoing relationship" phases with other buying entities.

In one embodiment, when a selling entity withdraws from an "ongoing relationship" with a buying entity, the system described above provides the buying entity with a final opportunity to rate the selling entity. The final rating that the buying entity provides, if any, remains associated with the selling entity, on the selling entity's visible record, for a specified period of time (e.g., one year).

XI. Trusted Buyer Network

Although numerical ratings from anonymous or unknown entities may influence a particular entity's decision to do business with a rated entity, opinions of known, trusted friends and associates are often more influential in the particular entity's decision-making process.

Thus, in one embodiment, the system described above allows a particular buying entity to be associated with one or more other buying entities in the particular buying entity's "trusted buyer network." Additionally, the system described above allows one or more selling entities to be associated with a buying entity in a special "trusted buyer insight" relationship. The associations in a particular buying entity's "trusted buyer network" determine, at least partially, with which selling entities the particular buying entity is in "trusted buyer insight" relationships. The way in which a buying entity becomes involved in a "trusted buyer insight" with a selling entity is described below, and the effect of the "trusted buyer network" on the "trusted buyer insight" relationship is then described further below.

In one embodiment, the association of a selling entity with a particular buying entity in a "trusted buyer insight" relationship is indicative that (a) the particular buying entity has engaged in at least one of the "pipeline" phases with the selling entity, or that (b) a second buying entity, which is in the particular buying entity's "trusted buyer network," has engaged in at least one of the "pipeline" phases with the selling entity, even if the particular buying entity never has, or that (c) a third buying entity, which is in the "trusted buyer network" of a second buying entity that is in the particular buying entity's "trusted buyer network," has engaged in at least one of the "pipeline" phases with the selling entity, even if neither the particular buying entity nor the second buying entity ever has.

Thus, in one embodiment, whenever a buying entity enters a "pipeline" phase with a selling entity, the system described above automatically associates the buying entity with the selling entity in a "trusted buyer insight" relationship. Additionally, in one embodiment, whenever a particular buying entity enters a "pipeline" phase with a selling entity, the system described above automatically associates each buying entity in the particular buying entity's "trusted buyer network" with the particular selling entity in a separate "trusted buyer insight" relationship. Additionally, in one embodiment, whenever a particular buying entity enters a "pipeline" phase with a selling entity, the system described above automatically associates each buying entity in the "trusted buyer networks" of each buying entity in the particular buying entity's "trusted buyer network" with the particular selling entity in a separate "trusted buyer insight" relationship. The process by which one buying entity becomes part of another buying entity's "trusted buyer network" is described further below.

A process by which buying entities become part of other buying entities' "trusted buyer networks" is now described. In one embodiment, each buying entity's "trusted buyer network" is composed of two separate groups: the buying entity's "immediate" network, and the buying entity's "extended" network. In one embodiment, the system described above presents, to a particular buying entity, a page that allows the particular buying entity to invite another buying entity to join the particular buying entity's "trusted buyer network," and, more specifically, the particular buying entity's "immediate" network. In one embodiment, the page also contains two lists: (a) a list of other buying entities that have invited the particular buying entity to join their "trusted buyer networks," and (b) a list of other buying entities that the particular buying entity has previously invited to join the particular buying entity's "trusted buyer network." In one embodiment, an indication of whether the particular buying entity's invitation was accepted, declined, or pending (not yet accepted or declined) by an invited buying entity is displayed next to that invited buying entity in the latter list.

When a particular buying entity invites another buying entity to join the former's "trusted buyer network," the particular buying entity is added to the latter's list of buying entities that have extended invitations to join "trusted buyer networks," as described above. Next to each buying entity in the particular buying entity's list of other buying entities that have invited the particular buying entity to join their "trusted buyer networks," the system described above may display an "accept" control and a "decline" control. If a user controlling the particular buying entity activates the "accept" control, then the particular buying entity is added to the inviting buying entity's "trusted buyer network," and, more specifically, to the inviting buying entity's "immediate" network. In one embodiment, this acceptance also causes the system described above to add the inviting buying entity to the particular buying entity's "immediate" network. Conversely, if a user controlling the particular buying entity activates the "decline" control, then the inviting buying entity's list of invited buying entities is updated to indicate that the particular buying entity has declined the inviting buying entity's invitation. Thus, buying entities may join the "trusted buyer networks" of others and invite others to join their own "trusted buyer networks."

The size of a buying entity's "trusted buyer network" may beneficially influence selling entities' behavior relative to that buying entity. In one embodiment, whenever the system described above provides, to a selling entity, a list of buying entities and/or buying entity's Needcasts™, the system displays, next to each of one or more entries in that list, a number that indicates how many other buying entities are in the "trusted buyer network" of that entry's corresponding buying entity. For example, if buying entity "A" has 15 other buying entities in its "trusted buyer network," then, in a list of Needcasts™ displayed to a selling entity, each Needcast™ originating from buying entity "A" may have the number "15" displayed next to it.

A large number of entities in a buying entity's "trusted buyer network" signals, to a selling entity, that the corresponding buying entity wields significant influence among buying entities in the system, and, as such, should be handled with due respect and care. If an influential buying entity gives a selling entity a high rating, then the selling entity's status in the system may be elevated significantly in the eyes of other buying entities. Conversely, if an influential buying entity gives a selling entity a low rating, then the selling entity's status in the system may be tarnished significantly in the eyes of other buying entities. Buying entities are naturally motivated to join as many "trusted buyer networks" as possible in order to increase their actual and selling entity-perceived influence in the system.

In one embodiment, in lists of selling entities and/or selling entity solicitations that are displayed to a buying entity, those of the selling entities that are associated with the buying entity in a "trusted buyer insight" relationship, and/or the solicitations of those selling entities, are visibly distinguished from other selling entities and/or solicitations. For example, in a list of solicitations presented to a buying entity, a special "circle-T" logo may be displayed next to each solicitation of a selling entity that is in the "trusted buyer insight" relationship with the buying entity.

A buying entity may find such a special designation useful when investigating solicitations or seeking for a product or service provider to fill the buying entity's need. The designation helps distinguish the designated selling entities from other selling entities that are not so designated. A selling entity may find such a special designation useful as a credential that distinguishes that selling entity from others in the eyes of a buying entity.

In one embodiment, in response to a particular buying entity's inquiry relative to a selected selling entity, the system described above displays a page that shows how the particular buying entity has become involved in "trusted buyer insight" relationship with a selected selling entity. The page may contain a separate icon for each participant in the relationship. Because the relationship may occur through one or more degrees of separation between the particular buying entity and the selling entity, the page may display multiple icons and their connections to each other.

In one embodiment, the page indicates an icon for the particular buying entity and an icon for the selling entity. If the particular buying entity has never entered a "pipeline" phase with the selling entity, then the page also indicates another icon that represents a second buying entity that has entered a "pipeline" phase with the selling entity. If the second buying entity is not in the particular buying entity's "immediate" network (but is in the particular buying entity's "extended" network), then the page also indicates yet another icon that represents a third buying entity, where (a) the third buying entity is in the particular buying entity's "immediate" network and (b) the second buying entity is in the third buying entity's "immediate" network. Thus, in one embodiment, the page displays the particular buying entity's icon, which is connected by a line to the third buying entity's icon, which is connected by a line to the second buying entity's icon, which is connected by a line to the selling entity's icon.

In one embodiment, buying entities that are not in the particular buying entity's own "immediate" network are not identified by name to the particular buying entity. Thus, while the page described above may display an icon for the second buying entity, the page may omit the identity of the second buying entity because the second buying entity is not in the particular buying entity's "immediate" network.

In one embodiment, the page described above indicates one or more ratings (e.g., per "pipeline" phase and/or an overall rating) given to the selling entity by the buying entity that entered into a "pipeline" phase with the selling entity. Thus, the particular buying entity may see the opinions of those that he trusts, or of those that trust those that he trusts, relative to the selling entity.

In one embodiment, the page also displays control that, when activated, allows the particular buying entity to ask a question of the buying entity that rated the selling entity (the "rating" entity hereafter). If the rating entity is in the particular buying entity's "immediate" network, then the system described above forwards the question to the rating entity. The rating entity may respond to the question, in which case the system described above forwards the response to the particular buying entity.

However, if the rating entity is not in the particular buying entity's "immediate" network, then the system described above forwards the question to the third buying entity, in whose "immediate" network the rating entity is, without revealing the rating entity's identity to the particular buying entity. The third buying entity receives the question, and, through the system, either agrees to allow the question to be forwarded to the rating entity, or declines to allow the question to be forwarded to the rating entity.

If the third buying entity agrees to allow the question to be forwarded to the rating entity, then the system forwards the question to the rating entity. In one embodiment, the message forwarded to the rating entity identifies the third buying entity as well as the particular buying entity. Upon receiving the message, the rating entity then may respond to the question, in which case the system forwards the response to the particular buying entity. In one embodiment, the rating entity's identity is revealed in the rating entity's response to the particular buying entity.

Alternatively, if the third buying entity does not agree to allow the question to be forwarded to the rating entity, then the system may notify the particular buying entity that the third buying entity has declined to allow the question to be forwarded to the rating entity, and the system does not forward the question. The rating entity remains anonymous to the particular buying entity.

In one embodiment, the page that the system displays to the particular buying entity (or, alternatively, another page) also indicates questions that other buying entities want to ask rating entities that are in the particular buying entity's "immediate" network (but not in the other buying entities' "immediate" network). Via controls displayed next to each such question, the particular buying entity may allow or prevent the system from forwarding the questions to the indicated rating entities.

In one embodiment, the page that the system displays to the particular buying entity (or, alternatively, another page) also indicates questions that other buying entities are asking the particular buying entity about one or more selling entities that the particular buying entity has rated. Next to each such question, the page may display the rating(s) that the particular buying entity gave to the selling entity to which the question pertains. Via controls displayed next to each such question, the particular buying entity may respond to the questions.

XII. Referral Incentives

Company websites often post executive or manager biographies on Internet-accessible pages (i.e., "web" pages) in order to instill confidence in the eyes of inventors or prospective customers. Usually, a person about whom such a biography has been posted does not want this biographical information to be used by solicitors in any attempt by the solicitors to gain an audience with the person, either personally or via phone or e-mail.

In order to deter solicitors from engaging in this undesirable behavior, and to encourage solicitors to use the system described above instead, in one embodiment, a graphical image such as a GIF or a JPEG is displayed on the page that contains the biography. The image contains instructions that tell the solicitors to use the system described above to send solicitations to the person. For example, the instructions may read, "NO SOLICITING. Please do not make sales calls to individuals on this page. They are registered at MyHandshake and are prepared to receive your contact there."

The code (e.g., HTML code) for the page contains a hyperlink that is associated with the image (e.g., in the HTML image tag for the image), such that when a solicitor clicks on the image using his browser, the solicitor's browser is automatically directed to a website that implements the system described above with reference to the figures of the present application.

A unique identity of a user that placed the image on the page is embedded in the hyperlink. As a result, when the solicitor's browser is directed to the website that implements the system, the identity of the user that placed the image is passed to the website and recognized by the system. The system may reward the user in response to receiving a "hit" from the solicitor's browser due to the browser being directed to the system by the image. Additionally or alternatively, the system may reward the user in response to a solicitor creating a seller account with the system during the same HTTP session in which the solicitor's browser was directed to the system by the image. For example, as a reward, a credit may be added to the user's account, or the user may be entered into a publicized drawing for a prize.

In one embodiment, the user that places the image on the company's page does not need to create either the image or the associated code that contains the hyperlink that directs browsers to the system. Instead, in one embodiment, such an image and the associated code (or the associated code alone) is generated automatically by the system described above with reference to the figures of the present application. When a buying entity accesses a particular URL of the system, the system executes a script or program that automatically generates a page that contains the image with the associated code, which indicates the buying entity's identity—the user's identity. The script or program is aware of the user's identity because the user has to provide his identity when he logs in to the system, and the user has to log into the system in order to access the particular URL that generates the image and associated code. The user may copy and paste the image and code from the automatically generated page into a page of a company's website, so that the image and accompanying code will be sent thereafter to the browser of everyone who visits that page of the company's website.

In one embodiment, the system presents the user/buying entity with a plurality of different images prior to the automatic generation of the code that contains the user-identifying hyperlink. When the user/buying entity selects an image, then the system executes the script or program that automatically generates a page that contains the selected image and the automatically generated code. Thus, in one embodiment, a user can "customize" the image that he would like to place on the company website's page.

XIII. Implementation Mechanisms, Alternatives & Extensions

Figure 9:
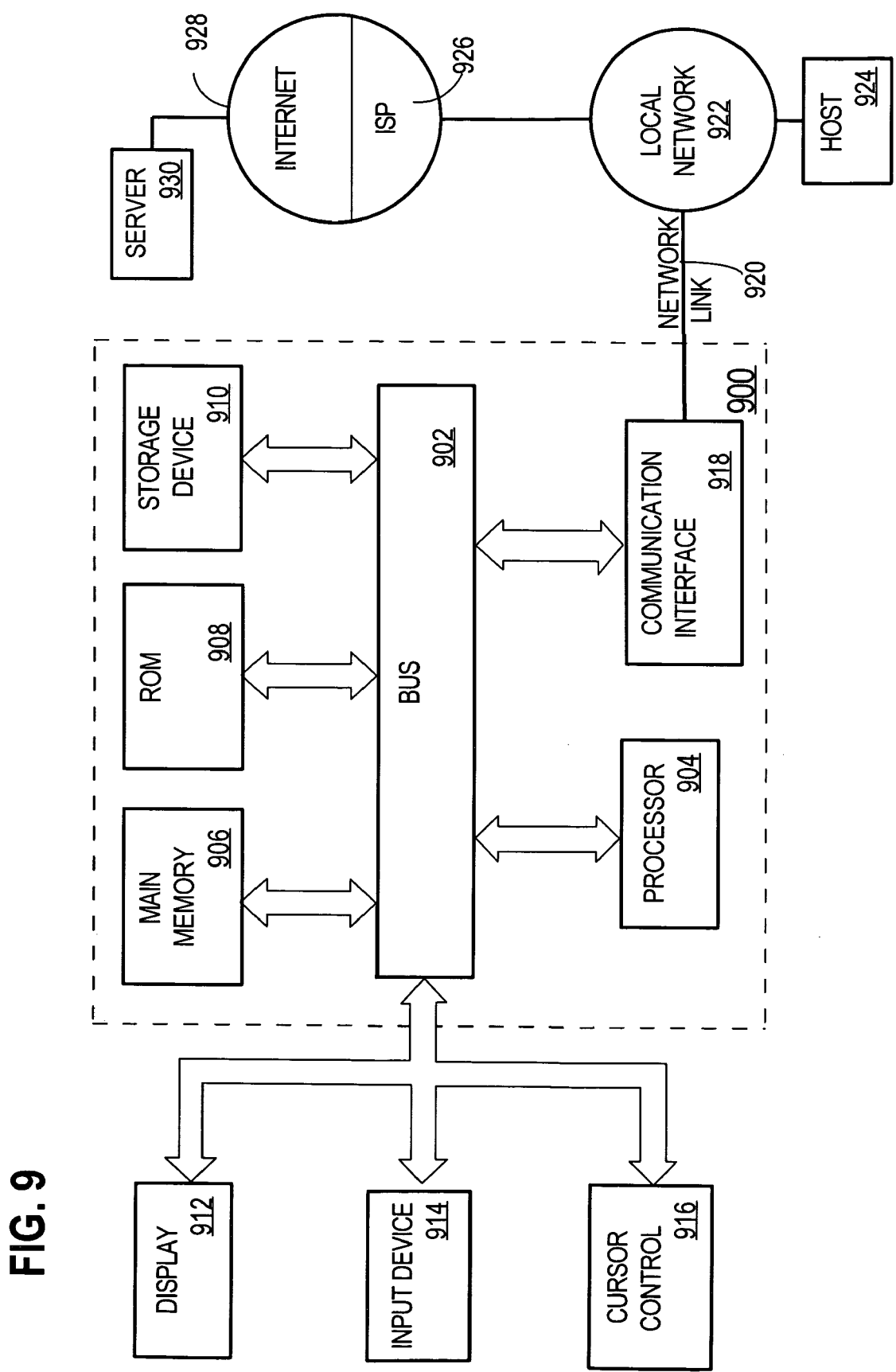
FIG. 9 is a block diagram that illustrates a computer system upon which an embodiment of the invention may be implemented.

The approach described herein for connecting buying entities and selling entities is applicable to a variety of contexts and implementations and is not limited to a particular context or implementation. FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for promoting business relationships, the method comprising the machine-implemented steps of:
   adding one or more buying entities to a first group that is associated with a first buying entity, wherein each buying entity in the first group is associated with a separate group of one or more other buying entities;
   determining, by a computer, whether any buying entity in the first group has previously rated a particular selling entity;
   determining whether any buying entity in any group that is associated with any buying entity in the first group has previously rated the particular selling entity;
   in response to determining specifically that at least a second buying entity in the first group, or at least a third buying entity in a second group that is associated with a fourth buying entity in the first group, has previously rated the particular selling entity, but not in response to determining that some other entity which is neither a buying entity in the first group nor a buying entity in any group that is associated with any buying entity in the first group has rated the particular selling entity, putting, on a page that is accessible to the first buying entity through a browser, a rating that either the second buying entity or the third buying entity assigned to the particular selling entity.

2. The method of claim 1, further comprising the machine-implemented steps of:
   receiving, from the first buying entity, a question that the first buying entity wants to ask the third buying entity regarding the particular selling entity, wherein the third buying entity is in the second group but not in the first group;
   in response to receiving the question, sending, to the fourth buying entity, a request for permission to send the question to the third buying entity;
   if the fourth buying entity grants permission to send the question to the third buying entity, then sending the question to the third buying entity; and
   if the fourth buying entity refuses permission to send the question to the third buying entity, then preventing the question from being sent to the third buying entity.

3. The method of claim 2, further comprising the machine-implemented step of:
   concealing the third buying entity's identity from the first buying entity until the third buying entity has sent a response to the question.

4. The method of claim 1, further comprising the machine-implemented step of:
   putting, on a page that is accessible to the particular selling entity through a browser, a number that indicates a sum of (a) a number of buying entities in the first group and (b) a number of buying entities in the second group.

5. The method of claim 1, further comprising the machine-implemented step of:
   receiving, from the first buying entity, an invitation for a fifth buying entity to join the first group;
   in response to receiving the invitation from the first buying entity, sending the invitation to the fifth buying entity;
   if the fifth buying entity accepts the invitation, then adding the fifth buying entity to the first group; and
   if the fifth buying entity declines the invitation, then preventing the fifth buying entity from being added to the first group.

6. The method of claim 5, further comprising the machine-implemented step of:
   if the fifth buying entity accepts the invitation, then adding the first buying entity to a trusted buyer network of the fifth buying entity.

7. The method of claim 1, further comprising the machine-implemented step of:
   in response to determining that at least the second buying entity or at least the third buying entity has previously rated the particular selling entity, putting, on a page that is accessible to the first buying entity through a browser, an indication that the particular selling entity is associated with the buying entity responsible for the particular selling entity rating in a trusted buyer insight relationship.

8. A machine-readable storage medium for promoting business relationships, the machine-readable storage medium carrying one or more sequences of instructions which, when executed by one or more processors cause the one or more processors to perform the steps of:
   adding one or more buying entities to a first group that is associated with a first buying entity, wherein each buying entity in the first group is associated with a separate group of one or more other buying entities;
   determining whether any buying entity in the first group has previously rated a particular selling entity;
   determining whether any buying entity in any group that is associated with any buying entity in the first group has previously rated the particular selling entity;
   in response to determining specifically that at least a second buying entity in the first group, or at least a third buying entity in a second group that is associated with a fourth buying entity in the first group, has previously rated the particular selling entity, but not in response to determining that some other entity which is neither a buying entity in the first group nor a buying entity in any group that is associated with any buying entity in the first group has rated the particular selling entity, putting, on a page that is accessible to the first buying entity through a browser, a rating that either the second buying entity or the third buying entity assigned to the particular selling entity.

9. The machine-readable medium of claim 8, wherein the one or more sequences of instructions, when executed by the one or more processors, further cause the one or more processors to perform the steps of:
   receiving, from the first buying entity, a question that the first buying entity wants to ask the third buying entity regarding the particular selling entity, wherein the third buying entity is in the second group but not in the first group;
   in response to receiving the question, sending, to the fourth buying entity, a request for permission to send the question to the third buying entity;
   if the fourth buying entity grants permission to send the question to the third buying entity, then sending the question to the third buying entity; and if the fourth buying entity refuses permission to send the question to the third buying entity, then preventing the question from being sent to the third buying entity.

10. The machine-readable medium of claim 9, wherein the one or more sequences of instructions, when executed by the one or more processors, further cause the one or more processors to perform the step of:

concealing the third buying entity's identity from the first buying entity until the third buying entity has sent a response to the question.

11. The machine-readable medium of claim 8, wherein the one or more sequences of instructions, when executed by the one or more processors, further cause the one or more processors to perform the step of:

putting, on a page that is accessible to the particular selling entity through a browser, a number that indicates a sum of (a) a number of buying entities in the first group and (b) a number of buying entities in the second group.

12. The machine-readable medium of claim 8, wherein the one or more sequences of instructions, when executed by the one or more processors, further cause the one or more processors to perform the steps of:

receiving, from the first buying entity, an invitation for a fifth buying entity to join the first group;

in response to receiving the invitation from the first buying entity, sending the invitation to the fifth buying entity;

if the fifth buying entity accepts the invitation, then adding the fifth buying entity to the first group; and if the fifth buying entity declines the invitation, then preventing the fifth buying entity from being added to the first group.

13. The machine-readable medium of claim 12, wherein the one or more sequences of instructions, when executed by the one or more processors, further cause the one or more processors to perform the step of:

if the fifth buying entity accepts the invitation, then adding the first buying entity to a trusted buyer network of the fifth buying entity.

14. The machine-readable medium of claim 8, wherein the one or more sequences of instructions, when executed by the one or more processors, further cause the one or more processors to perform the step of:

in response to determining that at least the second buying entity or at least the third buying entity has previously rated the particular selling entity, putting, on a page that is accessible to the first buying entity through a browser, an indication that the particular selling entity is associated with the buying entity responsible for the particular selling entity rating in a trusted buyer insight relationship.

* * * * *